US011314955B2

(12) United States Patent
Elabd et al.

(10) Patent No.: US 11,314,955 B2
(45) Date of Patent: Apr. 26, 2022

(54) OPTIMIZED RFID SYSTEM HAVING CHIP-BASED NOVEL SRAP AND DSRAP PROCESSES AND CHIP-LESS FREQUENCY-TIME CODED TAGS FOR INVENTORY MANAGEMENT

(71) Applicant: IORUSH, Aldie, VA (US)

(72) Inventors: Mohammed Elabd, Aldie, VA (US); Ahmed Zainaldin, Brambleton, VA (US); Hosam Elabd, Brambleton, VA (US)

(*) Notice: Subject to any disclaimer, the term of this patent is extended or adjusted under 35 U.S.C. 154(b) by 0 days.

(21) Appl. No.: 17/227,956

(22) Filed: Apr. 12, 2021

(65) Prior Publication Data
US 2021/0319193 A1 Oct. 14, 2021

Related U.S. Application Data

(60) Provisional application No. 63/009,638, filed on Apr. 14, 2020.

(51) Int. Cl.
*G06K 7/10* (2006.01)
*G06K 19/07* (2006.01)

(52) U.S. Cl.
CPC ..... *G06K 7/10366* (2013.01); *G06K 19/0723* (2013.01)

(58) Field of Classification Search
CPC .............. G06K 7/10366; G06K 19/0723
(Continued)

(56) References Cited

U.S. PATENT DOCUMENTS 5,539,775 A * 7/1996 Tuttle .................. G06K 7/0008
370/342
7,612,672 B2 11/2009 Choi et al.
(Continued)

*Primary Examiner* — Michael G Lee
*Assistant Examiner* — David Tardif

(57) ABSTRACT

The disclosure describes an RFID system having chip-based novel Simple Random-Access Procedure (SRAP) and Dynamic Simple Random-Access Procedure (DSRAP) tags, and chip-less time and frequency coded tags, for inventory management. The SRAP process contains static (pre-defined) size Frame Structures, and RFID tags compete for network resources by transmitting random preambles to contend for resources to send its Tag-ID to the RFID Reader. The DSRAP process contains dynamic (changing) size Frame Structures and is more efficient than SRAP if the number of tags is lower. The disclosed memory-based variants, save the orthogonal preambles in the tag's memory to reduce the number of transmitted bits and processing necessary to calculate the preambles. To further improve system efficiency and reduce the number of transmitted bits, disclosed memory-based variants may use a pre-defined memory-based modulation (QAM) signal in the memory of the transmitter of the Tags. The disclosure also presents a frequency and time coded chip-less RFID tag system. Each printed chip-less tag has a unique frequency signature, where each chip-less tag's ID is saved in a table in the main memory of the Reader (look-up-table) or in the middleware database. A variable time-delay is added to some chip-less tags to reuse the frequency signatures for a given frame, allowing millions and billions of products to be uniquely identified within a pre-defined time (~1 sec).

27 Claims, 20 Drawing Sheets

(58) Field of Classification Search
USPC .......................................................... 235/451
See application file for complete search history.

(56) References Cited

U.S. PATENT DOCUMENTS

| | | |
|---|---|---|
| 8,314,688 B2 | 11/2012 | Pahlavan et al. |
| 8,469,269 B2 | 6/2013 | Daily |
| 8,773,243 B1 * | 7/2014 | van Niekerk ...... G06K 19/0723 340/10.3 |
| 2008/0197982 A1 * | 8/2008 | Sadr .................. H03M 13/6331 340/10.4 |
| 2010/0060432 A1 * | 3/2010 | van Niekerk ........ G06K 7/0008 340/10.3 |
| 2010/0109847 A1 | 5/2010 | Noel |
| 2010/0127829 A1 * | 5/2010 | Daneshmand ....... G06K 7/0008 340/10.1 |
| 2015/0012396 A1 | 1/2015 | Puerini et al. |
| 2017/0270323 A1 * | 9/2017 | Butler ................ G06K 7/10198 |

\* cited by examiner

900

1000

1100

1300

1400

1600

1700

1800

1900
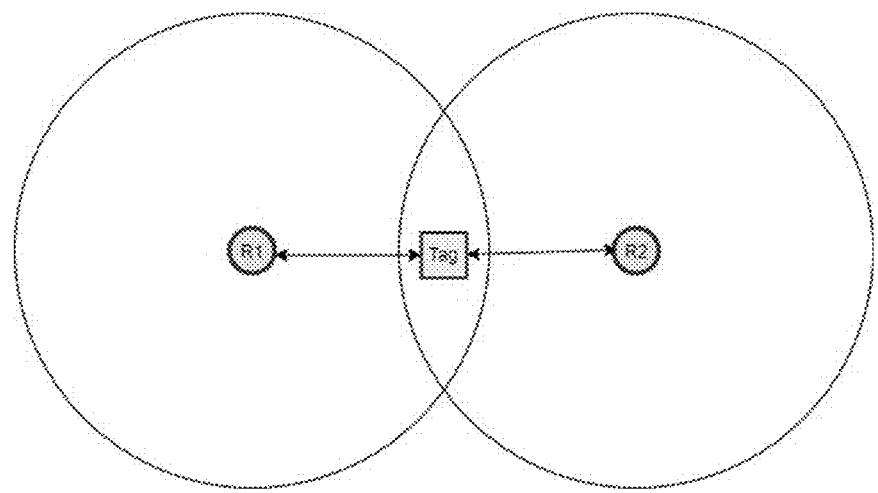
FIG. 19A: Reader-to-Tag Collision
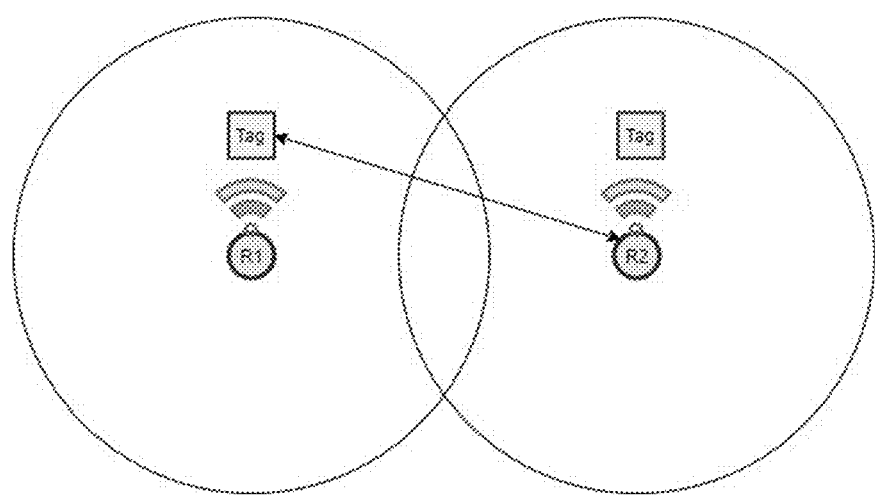
FIG. 19B: Reader-to-Reader Collision 2000
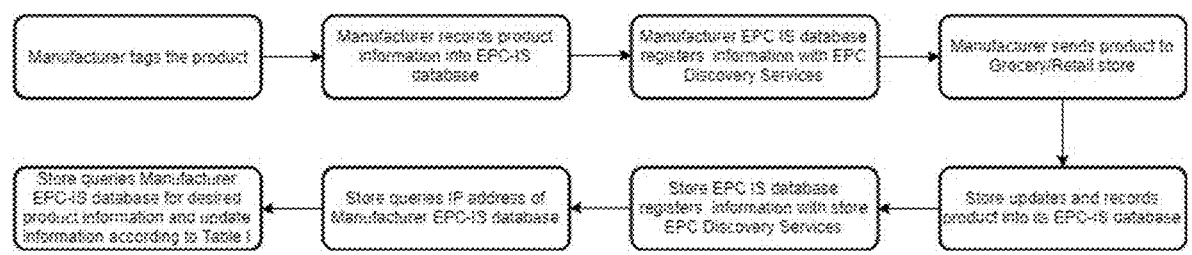
FIG. 20: Middleware Database Procedure

OPTIMIZED RFID SYSTEM HAVING CHIP-BASED NOVEL SRAP AND DSRAP PROCESSES AND CHIP-LESS FREQUENCY-TIME CODED TAGS FOR INVENTORY MANAGEMENT

BACKGROUND

Field

The disclosure of the present patent application relates to a computer software and hardware product having stored instructions for performing a chip-based or chip-less radio frequency identification (RFID) tag anti-collision Simple Random-Access Procedure (SRAP) and/or Dynamic Simple Random-Access Procedure (DSRAP) processes.

Description of the Related Art

Radio frequency identification technology (RFID) is considered a reference technology for wireless identification and item traceability. Grocery and retail stores are where the full potential of RFID can be harnessed. In theory, RFID in grocery and retail shows several advantages compared to traditional barcode systems, offering real-time inventory management, cash queues, and anti-theft capabilities, among others. RFID systems have yet to be deployed on a wide or global scale due to a high number of factors that degrade RFID system performance in these scenarios. These issues can cause RFID systems to lose control of items leaving them unidentified which eventually results in economic loss.

Present RFID literature studies focus usually on a single or a set of problems related to RFID systems, mainly the communication layers including: antenna design, interreference at the physical layer, Medium Access Control (MAC) protocols, security issues, and others. However, there are limited works describing the challenges and factors affecting RFID systems that consider the entire communication layer stack.

With the aim of maximizing the performance of RFID systems, researchers have proposed multiple implementations, such as varying the antennas orientation, testing different brands of tags, changing the position where the tags are attached to the items, varying the number of tags per pallet, and so on. However, no grocery or retail store has completely shifted to an RFID system because available processes are unreliable. Startups are developing smart carts but such inventions have similar uncertainties and potential for economic loss. Variability in performance has left investors weary and users frustrated.

Chip-Less Vs Chip-Based RFID Tags

There are advantages and disadvantages to Chip-less and Chip-based RFID tags. RFID systems may comprise of Chip-based or Chip-less tags. Chip-based tags may use Simple Random-Access Procedure (SRAP) or Dynamic Random-Access Procedure (DSRAP) processes. Chip-Less tags may encode data based on time, frequency, or a hybrid of both. 10 trillion products were estimated to be sold by year 2019 whereas, and each year, 75 billion of these products are expected to use RFID tags for identification. A comparative cost analysis of chip-based and chip-less RFID systems found that replacing today's chip-based tags with chip-less tags would achieve a cost reduction of almost 90%. Chip-less RFID tags have been invented as a low cost, robust, and adaptive alternative for barcode identification.

RFID systems consist of three main elements: a transponder or RFID tag for carrying identification Tag-ID (EPC) codes; a reader (integrator) for sending signals to RFID tags, receiving the scattered signal and identifying the Tag-ID; and middleware software which maintains an interface to encode identification data from the reader to a personal computer (i.e., a database). Passive RFID tags do not require any power supply, instead they utilize the electromagnetic wave as a source of energy to process and transmit data to the reader. This limits the range of detection for passive tags.

Although chip-based RFID systems have high encoding data capacities and long tag detection ranges, the high price for this technology is a barrier to utilization in most large-scale applications. For commercial applications, the main obstacles that prevent RFID tags from competing with optical barcode technology are its non-planar structure with antenna and chip, and the process of manufacturing chipped tags. By contrast, chip-less RFID with passive tags can be printed on different materials with a planar structure at low cost. These factors, along with the ability of chip-less RFID tags to detect tags outside the line-of-sight, make it a suitable candidate to replace conventional barcodes.

Chip-less RFID tags can be classified into multiple groups according to their encoding techniques. They include "time domain tags," "frequency domain tags," and "hybrid tags." Data can be encoded in chip-less RFID tags based on a different electromagnetic aspect of the tag including frequency, time, amplitude, phase or polarization. Time-domain chip-less RFID tags are interrogated by sending a signal from the reader in the form of a pulse and listening to the echoes of the pulse sent by the tag. A train of pulses is thereby created which can be used to encode data. Frequency-domain Spectral signature-based chip-less tags encode data into the spectrum using resonant structures. Each data bit is usually associated with the presence or absence of a resonant peak at a predetermined frequency in the spectrum. Using only one dimension of data encoding limits the amount of information encoded by each element. On the other hand, for encoding more information in a single dimension tag, multiple elements are required. Increasing the number of resonators increases the size of chip-less RFID tag and makes it impractical for some applications. There is a maximum number of resonances that can be used in a specified bandwidth, and increasing operating bandwidth is not always possible as it has the cost of designing UWB reader with a wider bandwidth. One approach to increase encoding data capacity is to use hybrid techniques which consider more than one parameter for each unit cell or utilize more than one dimension for data encoding in a given resonator. Therefore, more than one bit of data can be encoded by one element structure. At present, it is extremely challenging to provide a reliable, cost-effective, small size and scalable RFID system solution for applications such as grocery and retail.

Collision-Free Chip-Less RFID Systems

Chip-less tags may be susceptible to collisions because tags share the same operating frequency. Medium Access Control (MAC) techniques can prevent collisions between tags. Tag-tag collision occurs when different tags respond to the same reader at the same frequency simultaneously. Collisions reduce the throughput of data collection, increase the identification delay, and degrade the systems efficiency and reliability. Most previous works on anti-collision techniques for chip-less tags depend on the Time Difference of Arrival between the backscattered signals of the different tags. Examples of such work are Linear Frequency Modulated (LFM) signals and Fractional Fourier Transform (FrFT). These techniques have been utilized to detect the signals from various distances. However, these techniques do not prevent collisions for tags that are in close proximity, for example within one shopping cart. In addition, spread spectrum signature was also used, in the coding of the Time Domain Refractometry (TDR) chip-less tags to avoid collision. Short-Time-Matrix-Pencil Method (STMPM) has also been proposed to separate the tag-IDs of chip-less tags from one another. However, all these proposals have high performance computing needs, which will slow down the reading process in the real time systems and will significantly increase the reader's price. In addition, most works provide studies for a limited number of Tag-ID identifications, which precludes many applications including retail.

DESCRIPTION OF THE FIGURES

The various advantages of the embodiments will become apparent to one skilled in the art by reading the following specification and referencing the following drawings, in which:

FIG. 19A: is an embodiment of a reader-to-tag collision that occurs when a tag is located in overlapping coverage of the readers FIG. 19B: is an embodiment of a reader-to-reader collision that occurs when readers transmit signals at the same frequency and time instant FIG. 20: is an embodiment of the middleware database procedure for the disclosed RFID system

DETAILED DESCRIPTION OF THE PREFERRED EMBODIMENTS

Scenario Description

Figure 1:
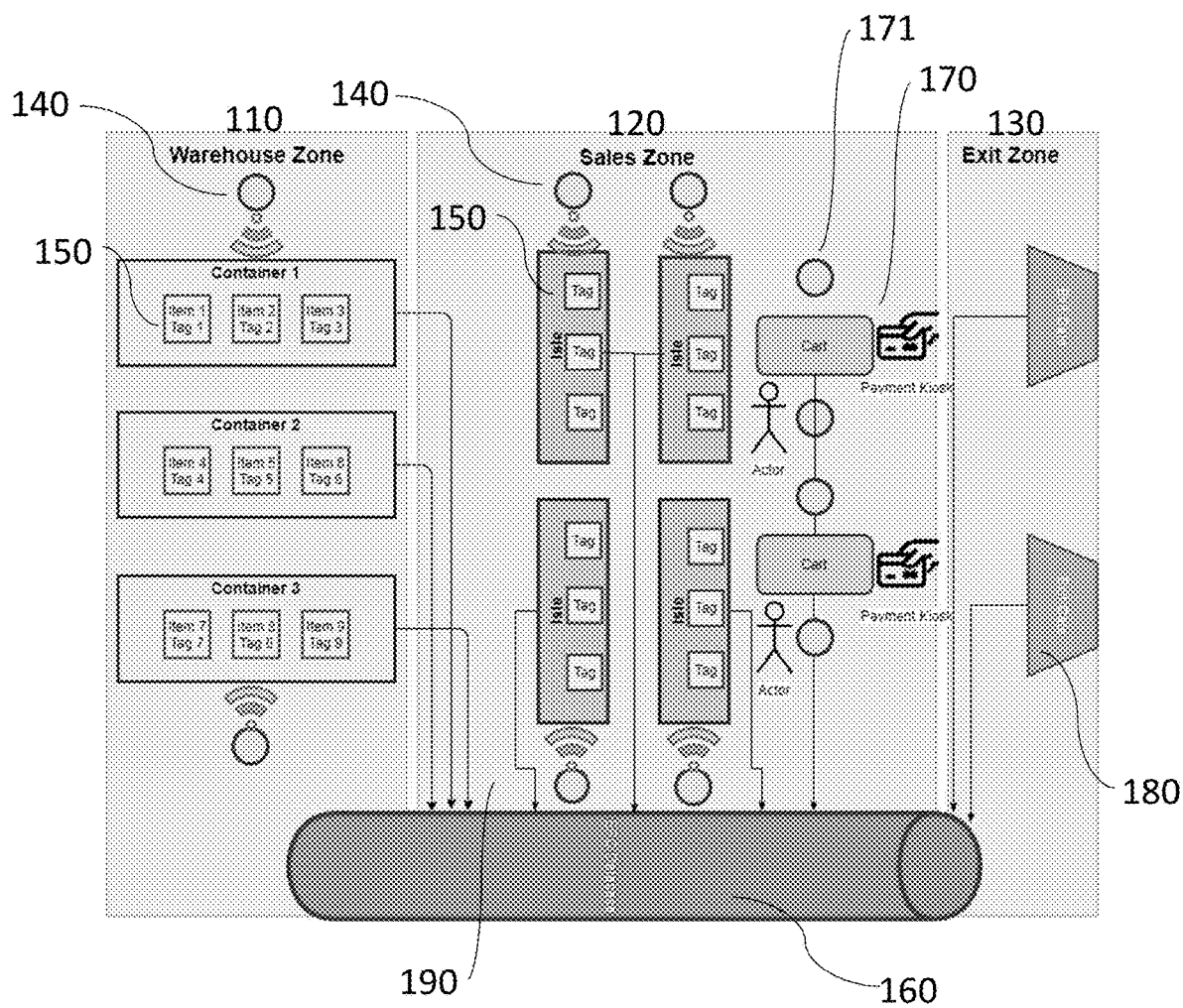
FIG. 1: is an embodiment of a scenario comprising of a warehouse and retail store in which the disclosed RFID system may be applied

As shown in FIG. 1, the example scenario is a grocery or a retail store 100 where an RFID system will be installed. The system will be composed of more than one reader and antenna 140, a middleware subsystem with databases 160, and products labelled with RFID tags 150. Each product will contain its own EPC code (Tag-ID) to make it separately identifiable and traceable. FIG. 1 illustrates an embodiment that provides a reliable, extremely fast, and efficient payment system. In addition, the disclosed RFID system provides a secure anti-theft system to prevent any unpaid items leaving the store.

The scenario has some desirable checking/reading points:
1. Entrance to warehouse. In the warehouse zone 110, the check-in of goods 150 arriving to the grocery/retail store is performed and the middleware database 160 is updated as new inventory comes in. This informs the store of available inventory in real-time. Alternatively, a store might record inventory in the database prior to its arrival in the warehouse in a place such as an inventory warehouse. This could assist a database administrator by providing as much detail as possible before shipments arrive at the store. Table 1 shows examples of proposed attributes that the middleware database could store for each tagged item.
2. Crossing gate warehouse-sales zone. At this point, the check-in/check-out of products entering or leaving the warehouse 190, and leaving or entering the sales zone 120, is made. This updates the middleware database 160 with real-time information about the available stock for sale.
3. Cash register system (Payment Gates). Every cash register or payment gate 170 is an identification point. The products are identified by the RFID system through the antennas installed on these gates 171 or special RFID readers. The RFID system connects to the middleware database 160 to get the price of the products. Once the items are paid for, the RFID system marks the items as sold and updates inventory. This will help the store identify when it is necessary to make new orders to suppliers. Additionally, once marked as sold the exit gates 180 will not sound an alarm when the customer leaves through the exit zone 130.

4. Exit doors/gates. The RFID system can be used as an anti-theft system by triggering an alarm for any unpaid products that pass through. This can involve a dedicated exit gate system 180 or part of the entrance/exit doors. In the case of anti-theft, a triangulation method can be employed to identify the exact location of the item not paid for. A camera, affixed on or near the exit gate 180, can take a photo of the person with unpaid items and send it to the middleware database 160. This information will be useful in case the same person appears again at any of the stores in the future. The middleware database can also be connected with law enforcement authorities to deter theft from all stores.

FIG. 1 depicts an embodiment where suppliers may be required to label their products with passive RFID tags operating in the implemented frequency band (UHF, UWB, mmWave), in the spectrum of frequencies permitted by the country where the store is located. In addition, tags attached to the goods may store the product's information in EPC code format. Finally, both suppliers and grocery/retail stores may connect their databases to an EPC-global Architecture Framework called EPCglobal Network, which allows the stores to trace and localize a product in real time, and worldwide.

TABLE I

| Parameter | Notes |
| --- | --- |
| Tag-ID | Required to be unique for each item (unlike barcode) |
| Parent Tag-ID (Optional) | In case it is an item inside of a box or another item with a Tag-ID |
| Barcode (Optional) | This could be useful initially if the barcode is still available until RFIDs take over. The Tag-ID can be mapped to a barcode to add an extra layer of security in case a person tries to modify or replace the RFID tags. It will confirm that the item has not been modified, which is useful in the case of returns and online shopping. |
| Price | Mapped to a Tag-ID or Barcode |
| Paid | A flag which notes whether the item has been paid for or not. It is useful for people leaving the store to make sure the item has been paid for. This item will be set to true when it is paid for and 0 if it has not been paid for or returned. |
| Payment date (Optional) | This can be useful for many reasons. For example, to figure out if it can be returned or not (i.e. time-dependent warranty). It can also be used if we decide to stop the tag sensor (transponder) from working after a specific amount of time. |
| Expected Location (Optional) | For example, which isle it should be added into. This is useful for inventory management. |
| Current Location (Optional) | If more location sensing is required, this can be implemented. This is useful if items are misplaced or in case of thefts. |
| Store/company Name (Optional) | This is useful if a convenience store buys from a bid store and re-uses the boxed item or the items inside of it. |
| Production Date (Optional) | Useful for inventory management. |
| Expiry Date (Optional) | Useful for inventory management. |
| Serial Number (Optional) | Useful for inventory management and matching of items with barcodes and Tag-IDs. |

TABLE I-continued

| Parameter | Notes |
| --- | --- |
| Time at current location (Optional) | If the current location has changed from the last reading (assuming it is saved in the system), this time will be reset. If the item remains at the same location for a pre-defined time, it will flag the central system that an item may be misplaced. |

RFID Physical Layer Factors

At the physical layer, the following factors influence the performance of RFID systems: frequency incompatibility and variation, the electromagnetic noise, and the absorption and reflection of RF signals. Such factors can trigger a loss of data communication between the tags and readers.

There are several different frequencies an RFID system can use. Generally, the most common include Low frequency, or LF, (125-134 kHz), High frequency, or HF, (13.56 MHz), Ultra-high frequency, or UHF, (433, and 860-960 MHz), and Microwave Frequencies (2.45 GHz, 5.2 GHz).

The disclosed RFID system can operate at many frequencies. Planning as to which frequency range is ideal for the solution provided is helpful. Some parameters to look at during planning are latency, range, interference and ability to shield the radio waves.

One useful parameter to look at is the data speed. The more items in a basket or cart, the more data will be exchanged between the item RFIDs and the RFID readers. The higher the frequency range, the higher the bandwidth. This usually makes the higher frequencies more useful especially as more Internet of Things (IoT) devices are deployed in the future. Hence, there is even more incentive to move to higher frequencies. The use of ultra-wide band and millimeter waves for identification applications is being investigated. The ultra-wideband (UWB) is the band of spectrum between 3 GHz and 10 GHz. The millimeter RFID is called millimeter wave identification (MMID). Millimeter wave spectrum is the band of spectrum between 30 GHz and 300 GHz.

There are several advantages of using higher frequency band in RFID systems. At extremely high frequencies, the data rates are substantially high. This can provide the advantage of scanning high numbers of items (transponders) in negligible time. Furthermore, at higher frequency bands, directional antennas can be designed to be very small which make it applicable to any type of packaging. An RFID reader device with a small directional antenna would provide the possibility of selecting a transponder by pointing toward it. This is not possible in current RFID systems because directional antennas are too large which makes it less applicable for retail packaging. An embodiment of the disclosed invention comprises a carefully designed directional antenna at the RFID reader which may help in locating transponders in high-density sensor networks or other places where transponders are densely located.

One implementing the disclosed system in the preferred embodiment also needs to take into consideration other physical environmental effects that can degrade the RFID system's performance. For example, metals in the shopping carts and shelves, the products with liquids, the refrigeration machines, the electromagnetic noise generated by the electrical equipment around the store, doors, elevators and even the human body can all affect the performance of the system. In addition, absorption and reflection have high influence on the performance. Absorption occurs when passive tags are attached to products with a high quantity of liquid or are located near them. When a reader tries to communicate with a tag in these situations, most of the tag incident signal is absorbed by the liquid. Reflection occurs when tags are near or attached to metals. The signal emitted by the reader is reflected by the metal, and again the tag is not able to send its information back to the reader.

RFID Medium Access Control (MAC) Layer Factors

The embodiment in FIG. 1 assumes there is a separate Tag-ID (tag) for each product 150. RFID readers 140 (at least one reader for each cash register 170, 171 and exit gate 180) will read these tags which are attached to products. When tags are within the coverage area of a reader, they simultaneously receive the incident signal of the reader which tells the tags to send their EPC code to the reader. When two or more tags transmit their EPC code at the same time, a tag-to-tag collision occurs (e.g., when hundreds of products are in the shopping cart and go through the reader antenna placed in the cash register system). To minimize the impact of these collisions, the readers currently on the market usually implement a medium access control (MAC) mechanism based on the worldwide standard EPCglobal Class-1 Gen-2. It defines a MAC mechanism for RFID readers working at UHF that organize the tags responses by a Frame Slotted Aloha (FSA) protocol, controlled by the reader. This is a very simple mechanism with a low rate of identification. This has led the scientific research community to propose new alternatives compatible with a standard that significantly increases the rate of identified tags per time unit. The disclosed RFID system offers major improvements on the current standard which allows hundreds of products to be read within a negligible amount of time (1-3 seconds). Two separate and preferred embodiments for achieving this result are disclosed, one for the Chip-based RFID Tags and a second one for Chip-less RFID Tags.

When two or more readers are operating in the same environment, reader-to-tag and reader-to-reader collisions occur. The former happens when the tags are located in the overlapping coverage area of two or more readers, for example, in FIG. 19A, when a tag is located in the overlapping coverage area of readers R1 and R2, the tag receives the signal from both readers but since the tag is a very simple device it is not able to select a reader to send its EPC code, even though readers are working at different frequencies. The reader-to-reader collisions occur when readers transmit signals at the same frequency and time instant (see FIG. 19B). Readers are configured with a specific transmit power, defined by the standards and regulations which can be different for every geographic region. The readers' output power limits the maximum reader-to-tag read range, that is, the maximum distance in which readers can feed the tags in order to trigger a response with their EPC codes. The reader's output power also sets the maximum distance in which readers can interfere with each other. In general, in an indoor environment, the output power allows readers to reach tags placed up to 10 meters away and interfere with other readers located up to 1000 meters away. In order to minimize the effects of reader-to-reader interferences, the EPCglobal Class-1 Gen-2 standard suggests a communication protocol for scenarios with multiple readers based on the frequency hop spread spectrum (FHSS) mechanism. Readers fix an operating frequency from a set, and they may jump randomly or in a programmed sequence to any frequency set by its ITU region. If the band is wide enough, the probability that two readers were operating at the same frequency is small. In an embodiment the disclosed invention may use blocking gates to absorb or reflect any remaining signals coming from the readers so that it does not interfere with other readers signals especially at a neighboring payment cash register.

RFID Middleware

As is shown in the scenario depicted in FIG. 1, the RFID middleware 160 plays a useful role in global identification and traceability. The EPCglobal Network contains the network architecture, elements in the global RFID traceability network, and the communication protocols used among the elements.

When a tag is identified, the reader only gets the EPC code (tag-ID) from the RFID product tag 150. The rest of the data of the identified product is obtained through the middleware 160, which performs a query to the system database where all the product data are stored. In the grocery/retail scenario, this may be the database managed by the store or main office. In this case, every EPC code registered is linked to a price and/or information relative to the product. Other data of interest, for example expiration date, recommended recipes, and other data shown in Table I are obtained when the store middleware 160 makes a direct query to the manufacturer's middleware database. The middleware 160 needs to know the address that provides access to the manufacturer's database. The middleware may obtain this sensitive information by querying to a server in the EPCglobal Network. This server works like a domain name server (DNS) in the Internet where the middleware asks for a company server, and the server answers with the associated IP address. On the other hand, if the data of interest is a record about product traceability, the middleware may make a query to the EPC Discovery Services, a server in the EPCglobal Network that stores a traceability record of products in the world, labelled with RFID tags that have a stored EPC code. The EPC Discovery Services server stores the locations and other relevant information from the product's life, starting with the moment that the product is labelled and recorded at the factory. The product's location is updated the moment that the product has moved, for example, from the factory to the provider, or from the supplier to the store. For instance, when a product enters the grocery store, it is registered by the middleware 160 in the EPC Discovery Services, indicating its new location. Hence, if the supermarket is going to operate under the EPCglobal Network, it is useful to set the agreements between the store and the suppliers, in order to have access to the products information stored in the EPCglobal Network.

A disclosed embodiment comprises an option to check if an item inside the box is misplaced whether by mistake or purposely, by checking the items with tags 150 inside the box and the box containing them itself (see Table I). Therefore, embodiments may have an optional parent tag addition. Whenever an item is paid for 170, the tag in the box and all items inside will be set to "paid". The complete middleware database procedure for the disclosed RFID system is illustrated in FIG. 20 according to an embodiment.

The following two sections disclose two variations of the disclosed RFID system: (1) Chip-Based Collision-Free RFID and (2) Chip-less Collision-Free RFID.

Disclosed Chip-Based Collision-Free RFID System

The disclosed Chip-based RFID system comprises a modified Simple Random-Access Procedure (SRAP) and Dynamic Simple Random-Access Procedure (DSRAP). First, this section describes the novel frame structure. Then it discusses embodiments of SRAP and DSRAP processes and embodiments of the disclosed memory-based processes. Our disclosed embodiments can operate in Frequency Division Duplexing (FDD) and Time Division Duplexing (TDD) frame architectures which make them flexible to implement.

Frame Structure

All disclosed chip-based random-access procedures are based on a new frame structure which consists of 5 phases as follows. For the purposes of clarity, embodiments of the 5 phases are depicted in FIGS. 3-8 and collision procedures are discussed below.

Figure 3:
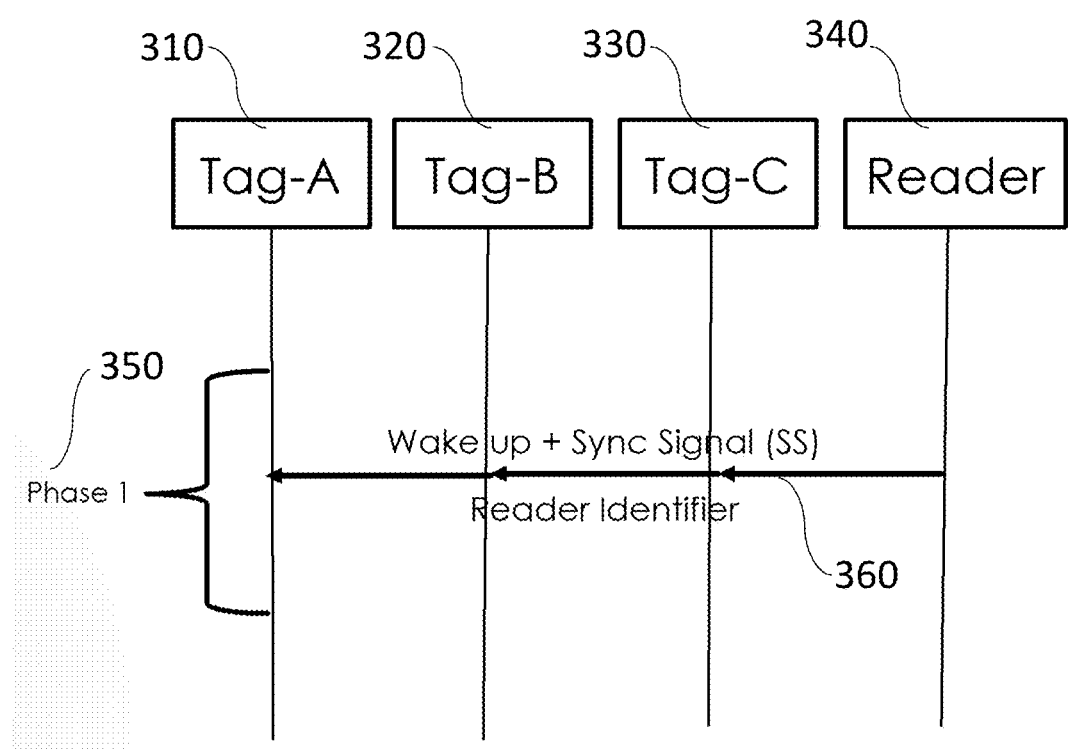
FIG. 3: is an embodiment of phase 1 of the frame structure for chip-based tags

As shown in FIG. 3, the following happens in Phase 1 350:

- A synchronization signal (SS) 360 is transmitted at the start of every frame on a pre-defined timer.
- The Reader 340 also transmits its ID (Reader-ID), in combination with the SS signal 360, to all tags 310, 320, 330 within its coverage area. This ID makes sure that once a tag is connected to one Reader 340, it does not connect to other Readers (avoid reader-to-reader collision).
- RFID tags wake up and synchronize by receiving and decoding the SS. The RFID tags are synchronized to the downlink RFID Reader signal after completing this procedure.

Figure 4:
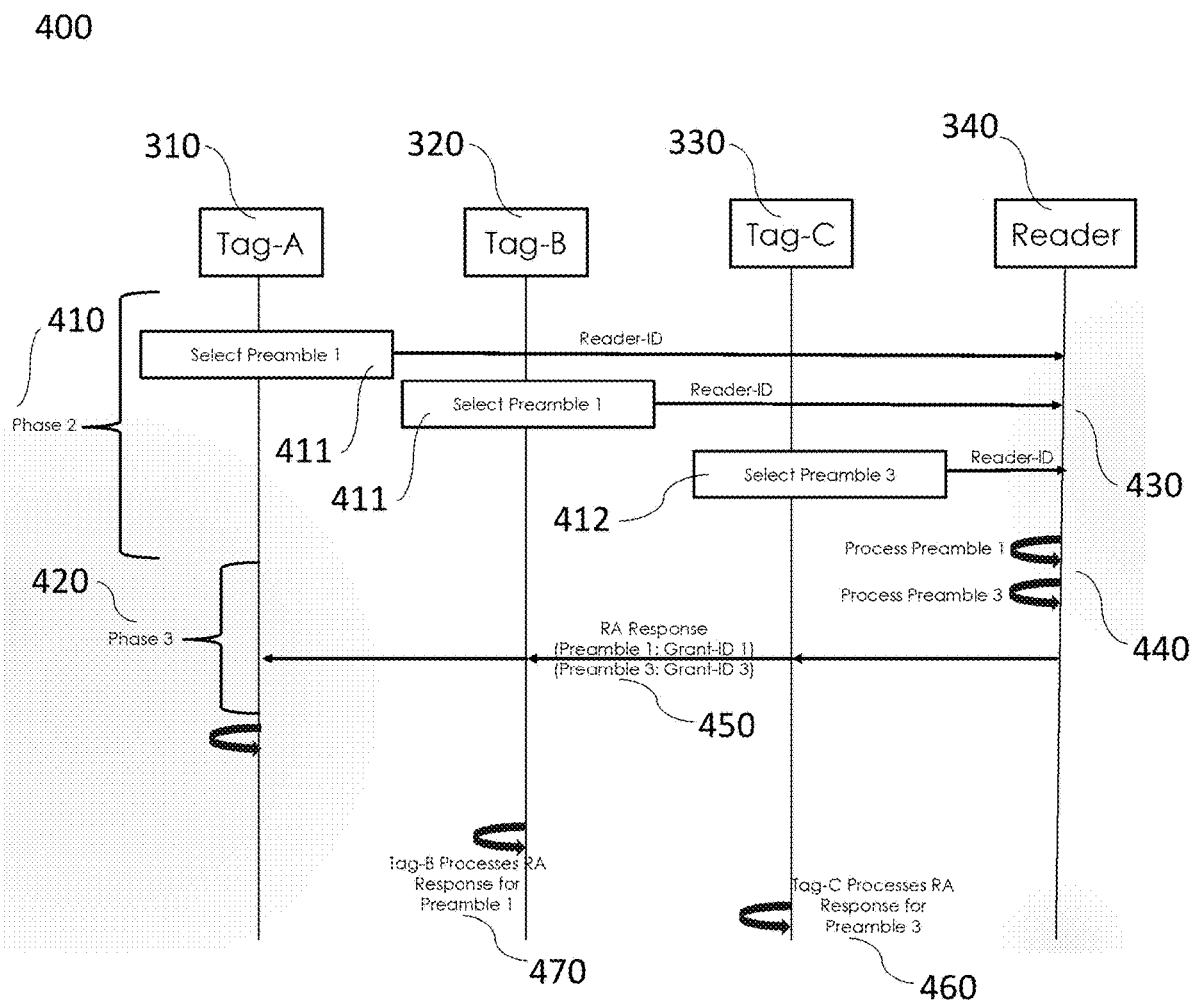
FIG. 4: is an embodiment of phase 2 and 3 of the frame structure for chip-based tags where two or more tags randomly select the same preamble and transmit to the reader at the same time

As shown in FIG. 4, the following occurs in Phase 2 410 when two or more tags randomly select the same preamble sequence and transmit to the Reader at the same time:

- Tag-A 310 randomly selects a random preamble sequence 411 from a set of orthogonal preamble sequences available. Examples of preamble sequences are the Zadoff-Chu or Walsh codes. Our simulations use 64 and 256 bit sequences.
- Tag-A 310 transmits the preamble on the next timeslot 430. This transmission does not carry the Tag-ID. It contains the Reader-ID which is saved from the initial sync message 360 from the Reader 340.
- Tag-B 320 happens to select the same preamble 411 as Tag-A 310. Tag-B 320 transmits the preamble at the same time 430. Since the tags are within the same distance, they will be received at the same instant by the Reader 340.
- Tag-C 330 randomly chooses between the available preambles (or Pre-defined) (i.e. preamble 3 412). Tag-C 330 also transmits at the same time as Tag-A 310 and Tag-B 320. preamble 1 411 and preamble 3 412 are orthogonal to each other, so both are received by the Reader 340 correctly.
- Tag-A/Tag-B preamble 1: The Reader detects the preamble transmission 411. It assigns a temporary ID 1(Grant-ID 1) to the tag (it assumes only one tag sent the preamble).
- Tag-C preamble 3: The Reader detects the preamble transmission 412. It assigns a temporary ID 3 (Grant-ID 3) to the tag.

As shown in FIG. 4, the following occurs in Phase 3 420 when two or more tags randomly select the same preamble sequence and transmit to the Reader at the same time:

- The Reader 340 assigns resources to RFID tags for each preamble received (1 and 3) 440.
- It then transmits the RA Response 450. The message carries a different temporary Tag-ID (Grant-ID) and uplink resource allocation for preamble 1 and preamble 3.
- Tag-A 310 saves the data (Grant-ID 1, resource grant) for preamble 1 470. Tag-A is synchronized in the return direction and can transmit its Tag-ID to the Reader through the assigned uplink resource at Phase 3.
- Tag-B 320 also saves the same data as Tag-A (Grant-ID 1, resource grant) for preamble 1 470. Tag-B is synchronized in the return direction and can transmit its Tag-ID to the Reader through the assigned uplink resource at Phase 3. Both Tag-A 310 and Tag-B 320 believe the resource grant is meant for them. At this stage the Reader and both tags do not know there is a possibility of a collision. This collision will be fixed in the contention resolution phase described below.
- Tag-C 330 saves the data (Grant-ID 3, resource grant) for preamble 3 460. Tag-C aligns the transmit time to synchronize in the return direction and can transmit its Tag-ID to the Reader through the assigned uplink resource.

Figure 5:
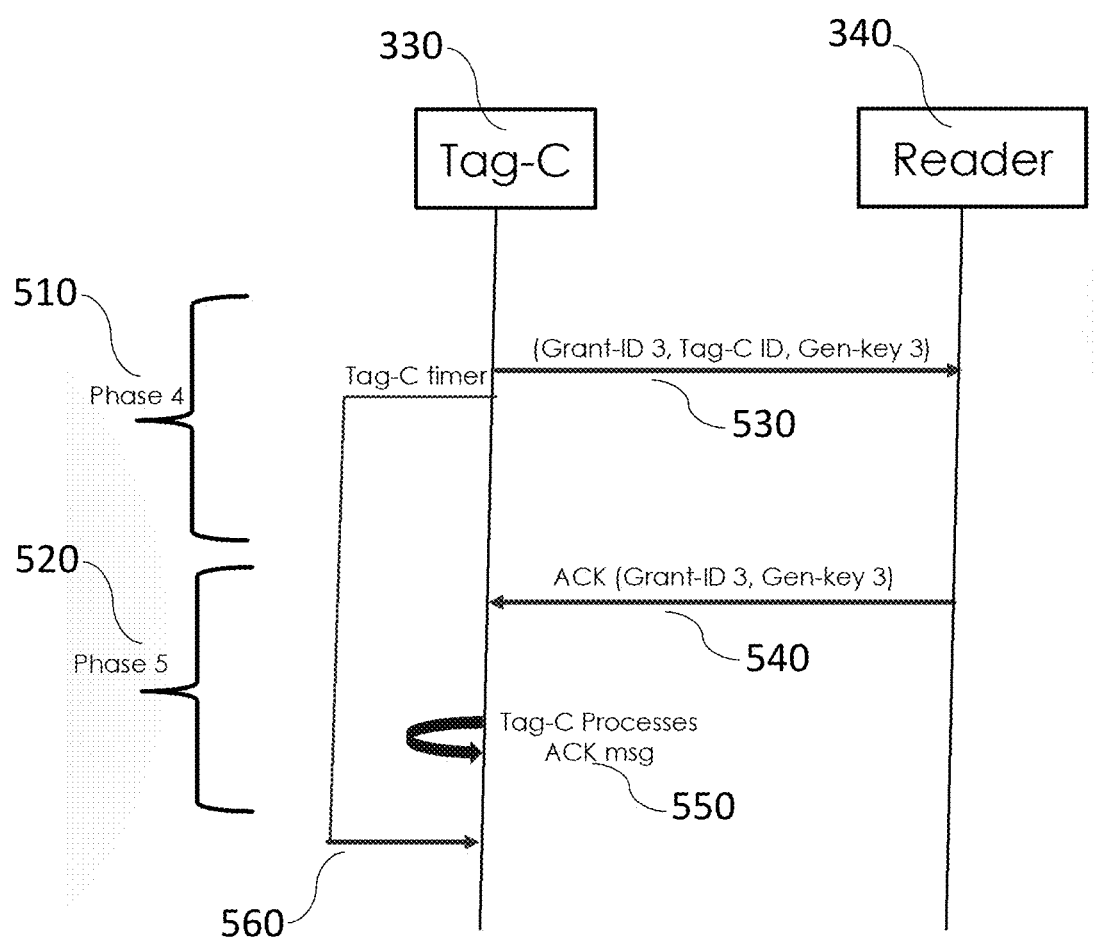
FIG. 5: is an embodiment of phase 4 and 5 of the frame structure for chip-based tags where Tag-C was properly assigned with no collision

As shown in FIG. 5, preamble 3 for Tag-C was assigned with no collision with other tags. This scenario illustrates a successful random access procedure. In Phase 4 510, Tag-C sends its Tag-ID along with its Grant-ID (provided from the reader in Phase 3) at its allocated timeslot 530. Tag-C also creates a new Gen-key 3 along with the Tag-ID message 530. The size of this message is the same as the size of the Grant-ID message allocated by the Reader 340 [$\log_2(p)$]. Tag-C starts a timer 560, awaiting an ACK from the Reader 340. In Phase 5 520, the Reader 340 accepts the transmission from Tag-C and acknowledges it with an ACK 540. The ACK message 540 contains the Grant-ID 3 assigned by the Reader along with the Gen-key 3 assigned by Tag-C. The Reader then assumes Tag-C ID as read and makes the Grant-ID 3 available again for future RA procedure from other tags. Tag-C receives the ACK and compares the parameters 550. It matches both Grant-ID 3 and Tag-C ID. It knows Tag-C ID is read by the Reader and goes into sleep mode until the requires time (indicated by the application) is met.

This embodiment of the random access preamble procedure does not enable unique identification of the tags, and it is possible that multiple tags attempted random access with the same preamble sequence on the same timeslot (as discussed above for Tag-A and Tag-B in FIGS. 3-4). The Contention Resolution phase helps uniquely identify the tag that has been selected if a collision occurs.

Figure 6:
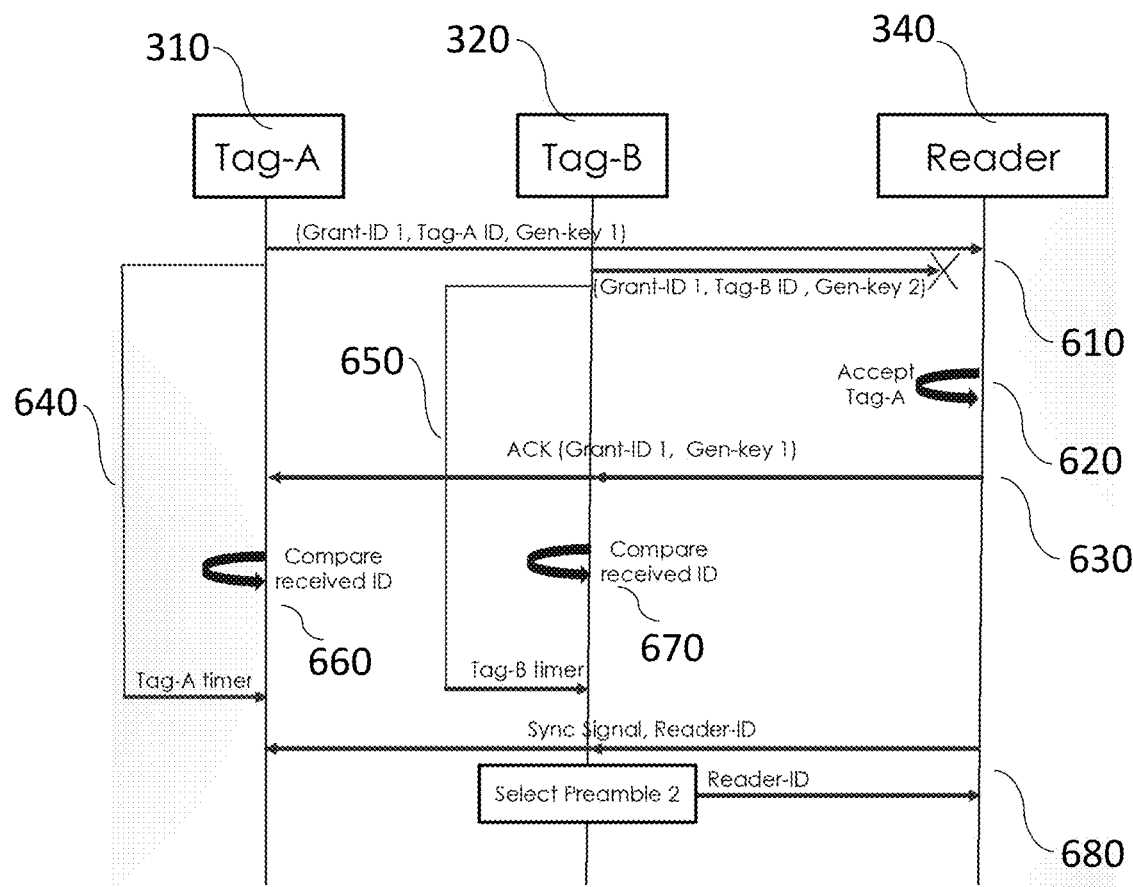
FIG. 6: is an embodiment of the contention resolution that takes place in the event two or more tags select the same preamble and transmit to the reader at different times

In the embodiment shown in FIG. 6, contention resolution will resolve the collision between Tag-A 310 and Tag-B 320. This embodiment assumes the Tag-A ID completely arrives before Tag-B.

- Tag-A 310 sends its Tag-ID at its allocated timeslot 610. Tag-A starts a timer 640, awaiting an ACK 630 from the Reader.
- Tag-B 320 also sends its Tag-ID. Tag-B transmits on the same timeslot assignment 610. FIG. 6 assumes the Reader receives the message from Tag-A slightly before Tag-B and that the Tag-B message 610 is lost. Tag-B also starts a timer 650 awaiting an ACK from the Reader.
- The Reader accepts the transmission from Tag-A 620 and acknowledges it with an ACK 630 containing Gen-key 1 and Tag-A ID.
- The Reader replies with an ACK 630. Both Tag-A and Tag-B assume that the ACK is for them. The message contains 'Tag-ID of Tag-A and temp-ID-1'. Tag-A receives the Reader's ACK transmission 660. The Reader 340 removes Grant-ID 1 from the list of available resources. It performs the sync signals and RA procedure repeatedly until all tag IDs have been retrieved. Tag-A does not send its preamble in the next cycles following its final ACK since it goes into a sleep state until the sleep timer is complete.
- Tag-B 320 receives the message containing the Tag-ID of Tag-A and after comparing it with its own ID, realizes that it has lost out to another tag in the contention resolution 670. It still waits for the timeout.

Tag-B times out for the RA procedure as it did not receive its own identity (Grant-ID with the matching Gen-key) in the contention resolution. Tag-B retries the RA Procedure.

Tag-B retries with a new Random preamble request and the complete RA Procedure 680.

Figure 7:
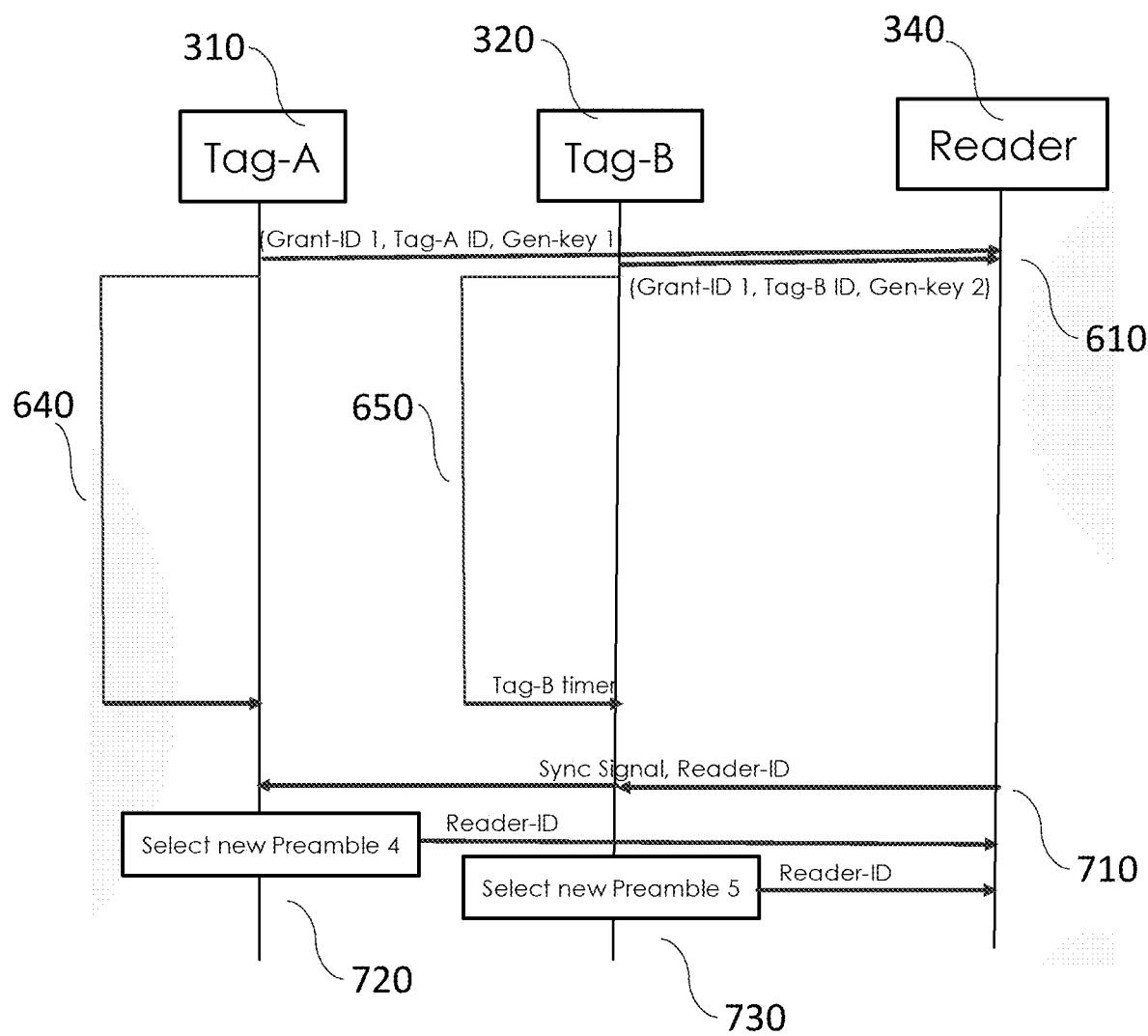
FIG. 7: is an embodiment of the contention resolution that takes place in the event two or more tags select the same preamble and transmit to the reader at the same time-instant

In the embodiment shown in FIG. 7, contention resolution will resolve the collision between Tag-A 310 and Tag-B 320. This embodiment assumes both Tag-A and Tag-B IDs arrive at the same time. A corrupted packet arrives at the Reader 340.

Tag-A and Tag-B send their Tag-IDs at the same allocated timeslot 610 (collision). The messages received by the Reader are corrupted. The Reader 340 drops both packets and decides to wait for the next sync signal for the tags to re-send new preambles 710.

Tag-A and Tag-B time out of the RA procedure as they did not receive any ACK messages 640, 650. Tag-A and Tag-B retry the RA Procedure in the next cycle 720, 730 after the sync signal 710.

Figure 8A:
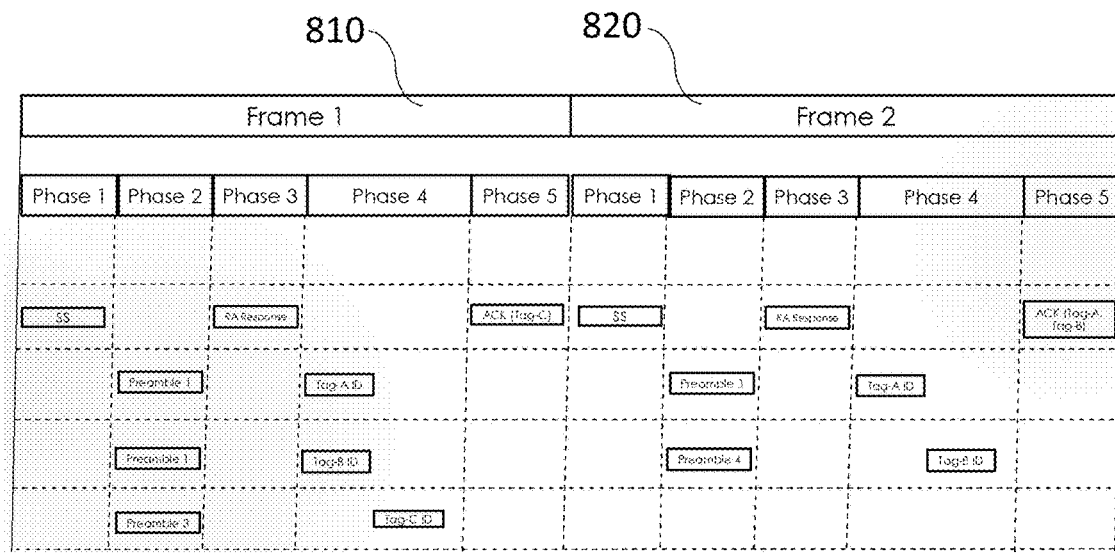
FIG. 8A: is an embodiment of the frame structure for the disclosed chip-based RFID system
Figure 8B:
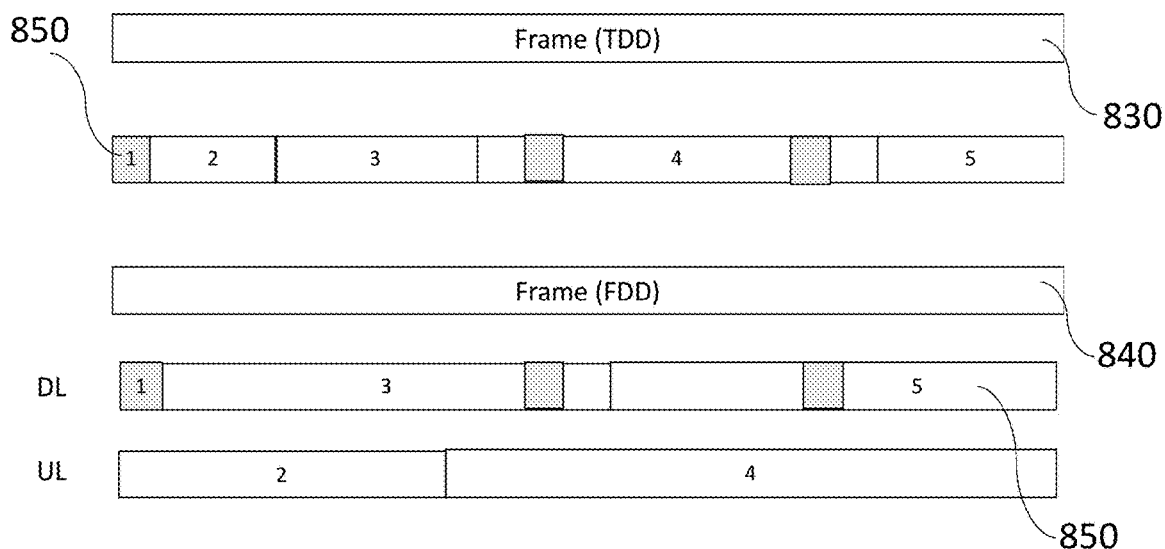
FIG. 8B: is an embodiment of the chip-based RFID system in both TDD and FDD frame structures with frequent transmission of synchronization signals

As shown in FIG. 8A, the advantage of the disclosed random-access procedure is the Simple Frame Structures. As shown in FIG. 8B, the procedure can operate in TDD and FDD frame architectures. Synchronization Signals 850 will be sent frequently in the DL (i.e., every 5 ms).

Simple Random-Access Procedure (SRAP)

The memoryless SRAP process contains static (pre-defined) size Frame Structures. The Frame and Phase (Subframe) sizes do not change from one Frame to the next. Tags compete for network resources by transmitting random preambles to contend for resources to send its Tag-ID.

Phase 1:

The reader transmits a synchronization signal (SS) at the start of every frame or a pre-defined timer.

The Reader also transmits its ID (Reader-ID) to all tags within its coverage area. This ID makes sure that once a tag is connected to one Reader, it does not connect to other Readers (avoid reader-to-reader collision).

RFID tags wake up and synchronize by receiving and decoding the SS. The RFID tags are synchronized to the downlink RFID Reader signal after completing this procedure.

The size of this phase is the sum of the SS and the Reader-ID.

Phase 2:

Each tag within the reader range randomly selects a random preamble sequence from a set of sequences available. The number of preambles available is $2^n$, where n is an integer. Examples of preamble sequences are the Zadoff-Chu or Walsh codes. In the embodiments simulated, there were either 64 and 256 preambles.

The tags perform the calculation of the random preamble sequence internally and do not need to store any random sequence in its memory, hence the tags are memoryless.

The size of this phase is the same as the preamble size. For example, in our simulated embodiments the size of this phase was 64- and 256-bits.

Phase 3:

The Reader assigns resources to RFID tags for each preamble received in Phase 2. It then transmits the random-access Response in Phase 3. The message carries the received preamble and a different temporary Tag-ID (Grant-ID). The Grant-ID is an uplink resource allocation for each preamble received by the Reader.

The tags will identify which Grant-IDs are for them by mapping the preamble sent by the Reader.

The size of the Grant-ID is $[\log_2(p)]$ and the Grant-ID represents an index from 0 to [p−1], where p represents both the number of available preambles and the size of the preambles in bits. For example, the size of the Grant-ID is 6 bits for 64-bit preamble sizes.

The size of this phase is [Preamble size (p)+Grant-ID size]×N, where N is the number of available preambles (p).

Phase 4:

Each tag saves the Grant-ID for its preamble. Tag-C aligns the transmit time to synchronize in the return direction and can transmit its Tag-ID to the Reader through the assigned uplink resource (Grant-ID).

The tag also creates a new random Gen-key ID along with the Tag-ID message. The size of the Gen-key ID is the same as the size of the Grant-ID message allocated by the reader $[\log 2(p)]$. The tag starts a timer, awaiting an ACK from the Reader.

In this Phase, the Reader will identify any collision between tags with the same preamble message.

The size of this phase is [Tag-ID size+Grant-ID size+Gen-key ID size]×N, where N is the number of available preambles (p).

Note that in SRAP, the process reserves slots for all possible preambles. This means that in the cases that no preamble is sent in a Frame, the respective slot will be empty.

Phase 5:

The Reader accepts the transmission from the tags and acknowledges each successful transmission with an ACK.

The ACK message contains the Grant-ID assigned by the Reader in Phase 3 along with the Gen-key ID assigned by the tag in Phase 4.

The Reader assumes the tag is read and makes the Grant-ID available again for future RA procedures from other tags.

After the tag receives the ACK and compares the parameters, it matches both the Grant-ID and Tag-ID. The tag determines that the Reader has read its Tag-ID and goes into sleep mode until the process starts over.

The size of this phase is the [Grant-ID size+Gen-key ID size]×N, where N is the number of available preambles (p).

Note that in SRAP, the process needs to reserve slots for all possible preambles. This means that in Phase 5, all possible Grant-IDs need to be taken into consideration even if the respected preamble was not used.

SRAP is a simple static process that reserves the slots whether the preamble is selected or not. In the case that the number of tags is small, the process can be inefficient. Whereas, in the case of many tags, it becomes more efficient because most of the resources will be occupied and no additional headers are needed for it to work as required by the DSRAP process described below.

Dynamic Simple Random-Access Procedure (DSRAP)

The memoryless DSRAP process contains dynamic (changing) size Frame Structures. The Frame and Phase (Subframe) sizes change from one Frame to the next. The disclosed preferred embodiment sometimes requires more processing than SRAP because the process needs to dynamically change the size in each Frame. The DSRAP process is more efficient than SRAP when the number of tags are relatively small.

Phases 1 and 2 of DSRAP are identical to Phases 1 and 2 of SRAP.

Phase 3:

The size of this phase is N0+[Preamble size (p)+Grant-ID size]×N2, where N0 is the number of received preambles in phase 2 represented by the number of bits required to represent them [$\log_2(p)$] bits, and N2 is the number of received (used) preambles in a given frame. The N2 value enables the plurality of RFID tags to recognize how many preambles have been received in Phase 2.

DSRAP Phase 3 is dynamic in size. The Reader transmits the preamble and Grant-IDs for only the received preambles in Phase 2. The N0 value makes this process dynamic because it lets the tags know how many slots will be used in this phase before moving to the next phase.

This process reserves uplink grants based on the number of received preambles in Phase 2 only. By contrast, in SRAP, the frame size is constant and does not change.

Phase 4:

This is identical to the SRAP process. However, the Tag-ID, Grant-ID and Gen-key ID are only reserved for the number of received preambles in Phase 2 (N2).

The size of this phase is [Tag-ID size+Grant-ID size+Gen-key ID size]×N2, where the Tag-ID, the Grant-ID, and the Gen-key ID are only reserved for the number of preambles received in the second phase of instructions (N2).

This phase does not require N0 because each tag will reuse the same slot allocated in phase 3 and the reader knows how many preambles were received in the second phase.

Phase 5:

The concept is similar to SRAP. However, only the successfully received (collision-free) preamble transmission will be reserved in DRAP. In SRAP, the process reserves resources for all Grant-IDs available whether they are used or not.

The size of this phase is $N_{ACK}$+[Grant-ID size+Gen-key ID size]×N3, where $N_{ACK}$ is the number of tags with ACK messages in Phase 5 represented by the number of bits required to represent them [$\log_2(p)$] bits, and N3 is the number of successfully received (collision-free) preambles in a given frame.

$N_{ACK}$ makes this process dynamic because it lets the tags know how many slots will be used in this phase.

In DSRAP, the process is dynamic and reserves slots only for the received preambles in Phase 2. With a small number of tags, the DSRAP process can be more efficient than SRAP. If there is a large number of tags, the process becomes less efficient because it uses more headers to modify the frame size even though most of the resources are occupied.

SRAP vs DSRAP Comparison

Figure 2:
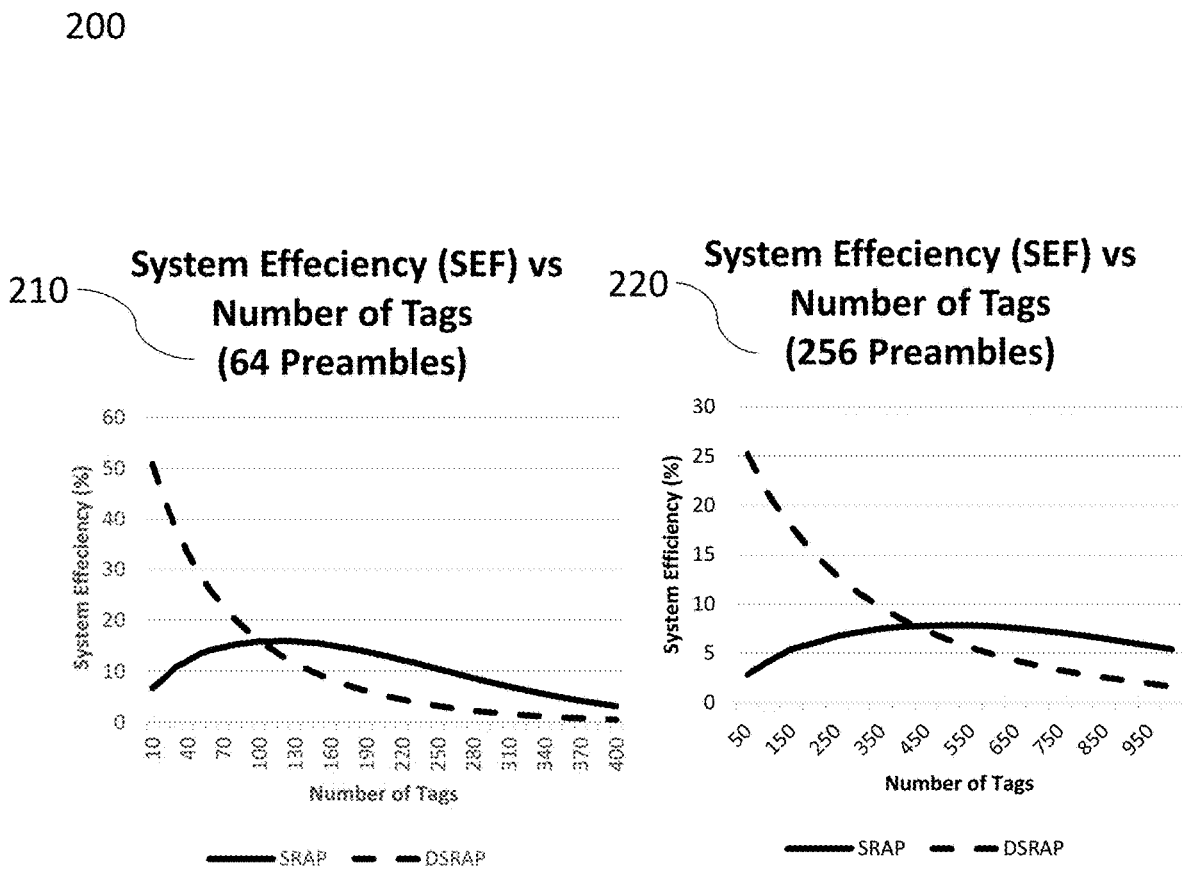
FIG. 2: compares system efficiency between SRAP and DSRAP processes based on the number of tags. One graph represents a simulation incorporating 64 preambles and the other represents 256 preambles.

FIG. 2, compares system efficiency between SRAP and DSRAP based on the number of tags. One graph represents an embodiment incorporating 64 preambles 210 and the other represents 256 preambles 220. The DSRAP process performs better than SRAP with lower number of tags. As the number of tags increases, SRAP performs more efficiently than DSRAP, because it does not expend resources making the process dynamic. Therefore, SRAP may be preferred in applications that require a large number of tags to be read instantly, whereas DSRAP may be preferred in applications that require a lower number of tags.

For example, in the embodiment depicted in FIG. 1, grocery/retail stores with fewer than 100 items may prefer DSRAP-based processes over SRAP. However, warehouse facilities or shipment couriers, where large numbers of items are scanned simultaneously, may prefer SRAP-based processes. Alternatively, another solution might involve a hybrid process, in which the Readers and tags are smart enough to support both SRAP and DSRAP processes dynamically based on the preamble count received.

First Memory-Based Preamble SRAP (M1SRAP)

This process is based on the SRAP process. The disclosed embodiment comprises a SRAP process where the orthogonal preambles are saved in memory of the tag to reduce the number of transmitted bits and need to calculate preamble sequences in Phase 2. In Phase 3, the preambles are not transmitted with the Grant-IDs because each slot corresponds to the index of the mapped preamble. Therefore, the number of transmitted bits will reduce significantly, increasing system efficiency compared to SRAP. Tags may require bigger chip sizes to accommodate the memory needed to save all preambles. The size of each phase is the same as SRAP except in Phase 3. The size of Phase 3 in M1SRAP is [Grant-ID]×N, where N is the number of available preambles (p).

First Memory-Based Preamble DSRAP (M1DSRAP)

This process is based on the DSRAP process. The disclosed embodiment comprises a DSRAP process where the orthogonal preambles are saved in memory of the tag to reduce the number of transmitted bits and need to calculate preamble sequences in Phase 2. In Phase 3, the preambles are not transmitted with the Grant-IDs because each slot corresponds to the index of the mapped preamble. Therefore, the number of transmitted bits will reduce, increasing system efficiency compared to DSRAP. However, tags may require bigger chip sizes to accommodate the memory needed to save all preambles. The size of each phase is the same as DSRAP except in Phase 3. The size of Phase 3 in M1DSRAP is N0+[N1+Grant-ID size]×N2, where N0 is the number of bits required to represent the number of received preambles in phase 2 [$\log_2(p)$] bits, N1 is the user-selected preamble index of size [$\log_2(p)$] bits, and N2 is the number of received (used) preambles in a given frame. The disclosed memory-based procedure is more efficient because it only transmits the index rather than the complete preamble which reduces the number of bits that must be transmitted.

Constellation and Modulation (M QAM)

The Signal-to-Noise Ratio (SNR) will be high since the tagged devices will be within line-of-sight (LOS) and a short distance from the readers. The M2SRAP and M2DSRAP processes may utilize a pre-defined memory-based QAM (M QAM) which will be saved in the memory of tags to avoid having to measure and form constellations repeatedly. An embodiment may comprise a preferred memory-based QAM integrated into the RFID tags (simulations only considered QPSK (2 bits/symbol)). The simulations illustrate that by applying only QPSK, the system efficiency (SEF) is significantly enhanced compared to existing solutions. Demodulation of the M QAM will be required in the RFID Reader (can be memory based or legacy QAM circuit).

Second Memory-Based Preamble/Modulation SRAP (M2SRAP)

This process is based on SRAP. The disclosed embodiment comprises a SRAP process with memory for the available preambles as used in M1SRAP. This process utilizes a pre-defined memory-based modulation (QAM) signal. The symbols (constellation) can be saved in the tag's memory such that whenever a specific symbol is sent, it will be saved in the memory. This means that the system does not need to identify which modulation and coding scheme to select. We can assume a good channel condition (SNR) because the distance can be short. The sizes of Phases 3, 4, and 5 can be reduced, increasing efficiency. For example, the size will be halved if quadrature phase shift keying (QPSK) is used rather than binary phase shift keying (BPSK), compared to M1SRAP. Better efficiency will also be achieved if higher modulation schemes such as 64-QAM, are used.

Second Memory-Based Preamble/Modulation DSRAP (M2DSRAP)

This process is based on DSRAP. The disclosed embodiment comprises a DSRAP process with memory for the available preambles and the same constellation and modulation principles used in M2SRAP.

The simulation results shown in FIGS. 9-13 highlight the performance improvements of the disclosed memory-based process embodiments compared to memoryless process embodiments. Memory-based processes may be favored over memoryless processes in cases where larger tags are used. Grocery items for example may use smaller tags, while tags inside carts or bags might use bigger tags.

Review of Standard and Disclosed Embodiments

Based on the disclosed chip-based RFID system above, this work shows multiple chip-based RFID options including simulations for comparison.

Simple Random-Access Procedure (SRAP)
  This procedure includes the following features:
  Pre-defined Static-size Frame Structure (based on number of preambles)
  Tags compete for resources randomly
  Less expensive to implement
  Can operate in TDD and FDD frame architectures
  Low efficiency due to high number of idle slots in cases with a low number of tags
  In Phase 3, the procedure assumes the Reader allocates the preamble and the grant-ID for all available preambles whether the preambles are used or not (static frame size).

| Phase Number | Size in bits per Phase (SRAP) |
| --- | --- |
| Phase 1 | [SS + Reader-ID] (8 bits) |
| Phase 2 | Preamble size (p) = $2^n$ bits |
| Phase 3 | [Preamble Size (p) + Grant-ID ($\log_2(p)$)] × N bits |
| Phase 4 | [Tag-ID + Grant-ID + Gen-key ($\log_2(p)$)] × N bits |
| Phase 5 | [Grant-ID + Gen-key] × N bits |

The parameter sizes of SRAP for the preferred embodiment are defined as follows:
  Preamble Size: p=$2^n$ (64 or 256 bits in simulated embodiments)
  N: Number of available preambles (p)
  Grant-ID size: $\log_2(p)$ bits
  Gen-key size: $\log_2(p)$ bits
  Tag-ID size: Application specific Dynamic Simple Random-Access Procedure (DSRAP)
  This procedure includes the following features:
  Dynamic-size Frame Structure (proportional with number of users and used preambles)
  Faster process than SRAP (shorter frame size)
  More processing to implement than SRAP
  Can operate in TDD and FDD frame architectures
  Higher efficiency than SRAP because only used preambles are transmitted
  In Phase 3, the procedure assumes the Reader transmits the preamble and the grant-ID for only the received preambles in Phase $2^n$ (Dynamic frame size).

| Phase Number | Size in bits per Phase (DSRAP) |
| --- | --- |
| Phase 1 | [SS +Reader-ID] (8 bits) |
| Phase 2 | Preamble size (p) = $2^n$ bits |
| Phase 3 | N0 [Preamble Size + Grant-ID] × N2 bits |
| Phase 4 | [Tag-ID + Grant-ID + Gen-key] × N2 bits |
| Phase 5 | $N_{ACK}$ + [Grant-ID size + Gen-key ID size] × N3 |

The parameter sizes of DSRAP for the preferred embodiment are defined as follows:
  Preamble Size: p=$2^n$ (64 or 256 bits in simulated embodiments)
  Grant-ID size: $\log_2(p)$ bits
  Gen-key size: $\log_2(p)$ bits
  N0: number of received preambles in phase 2 represented by the number of bits required to represent them [$\log_2(p)$] bits
  N2: Number of received (used) preambles in a given frame
  $N_{ACK}$: number of tags with ACK messages in Phase 5 represented by the number of bits required to represent them [$\log_2(p)$]
  N3: number of successfully received (collision-free) preambles in a given frame
  Tag-ID size: application specific (128 bits in simulations)

First Memory-Based Preamble SRAP (M1SRAP)
  This procedure includes the following features:
  Based on SRAP
  The orthogonal preambles are saved in memory of the tag to reduce # of transmission bits.
  Phase 3: preambles are not transmitted with the Grant-IDs because each slot corresponds to the index of the mapped preamble
  Significantly increases efficiency at the expense of increasing size to accommodate memory
  In Phase 3, the procedure assumes the Reader allocates only the grant-ID for all available preambles whether the preambles are used or not (static frame size). The tags save all available preambles in their memory.

| Phase Number | Size in bits per Phase (SRAP) |
| --- | --- |
| Phase 1 | [SS + Reader-ID] (8 bits) |
| Phase 2 | Preamble size (p) = $2^n$ bits |
| Phase 3 | Grant-ID × N bits |
| Phase 4 | [Tag-ID + Grant-ID + Gen-key] × N bits |
| Phase 5 | [Grant-ID + Gen-key] × N bits |

The parameter sizes of M1SRAP are defined as follows:
  Preamble Size: p=$2^n$ (64 or 256 bits in simulated embodiments)
  Grant-ID size: $\log_2(p)$ bits
  Gen-key size: $\log_2(p)$ bits
  N: Number of available preambles [p]
  Tag-ID size: Application specific (128 bits in simulations)

First Memory-Based Preamble DSRAP (M1DSRAP):
  This procedure includes the following features:
  Based on DSRAP
  The orthogonal preambles are saved in memory of the tag to reduce number of transmission bits.

Phase 3: preambles are only transmitted with the Grant-IDs because each slot corresponds to the index of the mapped preamble Significantly increased efficiency

| Phase Number | Size in bits per Phase (DSRAP) |
|---|---|
| Phase 1 | [SS + Reader-ID] (8 bits) |
| Phase 2 | Preamble size (p) = $2^n$ bits |
| Phase 3 | N0 + [N1 + Grant-ID] × N2 bits |
| Phase 4 | [Tag-ID + Grant-ID + Gen-key] × N2 bits |
| Phase 5 | $N_{ACK}$ + Grant-ID + Gen-key] × N3 bits |

The parameter sizes of M1DSRAP are defined as follows:
Preamble Size: p=$2^n$ (64 or 256 bits in simulated embodiments)
Grant-ID size: $\log_2(p)$ bits
Gen-key size: $\log_2(p)$ bits
N0: number of bits required to represent the number of received preambles in phase 2 [$\log_2(p)$] bits
N1: user-selected preamble index of size [$\log_2(p)$] bits
N2: number of received (used) preambles in a given frame
N3: number of successfully received (collision-free) preambles in a given frame
$N_{ACK}$: number of tags with ACK messages in Phase 5 represented by the number of bits required to represent them [$\log_2(p)$]
Tag-ID size: application specific (128 bits in simulations)
Second Memory-Based Preamble/Modulation SRAP (M2SRAP):
SS signals (Phase 1) and preambles (Phase 2) are transmitted in BPSK. In all remaining Phases, QPSK is considered.

| Phase Number | Size in bits per Phase (SRAP) |
|---|---|
| Phase 1 | [SS + Reader-ID] (8 bits) |
| Phase 2 | Preamble size (p) = $2^n$ bits |
| Phase 3 | Grant-ID/2 × N bits |
| Phase 4 | [Tag-ID + Grant-ID + Gen-key] × N/2 bits |
| Phase 5 | [Grant-ID + Gen-key] × N/2 bits |

The parameter sizes of M2SRAP are defined as follows:
Preamble Size: p=$2^n$ (64 or 256 bits in simulated embodiments)
Grant-ID size: $\log_2(p)$ bits
Gen-key size: $\log_2(p)$ bits
N: number of available preambles
Tag-ID size: application specific
Second Memory-Based Preamble/Modulation DSRAP (M2DSRAP):
SS signals (Phase 1) and preambles (Phase 2) are transmitted in BPSK. In all remaining Phases, QPSK is considered.

| Phase Number | Size in bits per Phase (DSRAP) |
|---|---|
| Phase 1 | [SS + Reader-ID] (8 bits) |
| Phase 2 | Preamble Size bits |
| Phase 3 | N0 + [N1 + Grant-ID] × N2/2 bits |
| Phase 4 | [Tag-ID + Grant-ID + Gen-key] × N2/2 bits |
| Phase 5 | N0 + [Grant-ID + Gen-key] × N3/2 bits |

Figure 9:
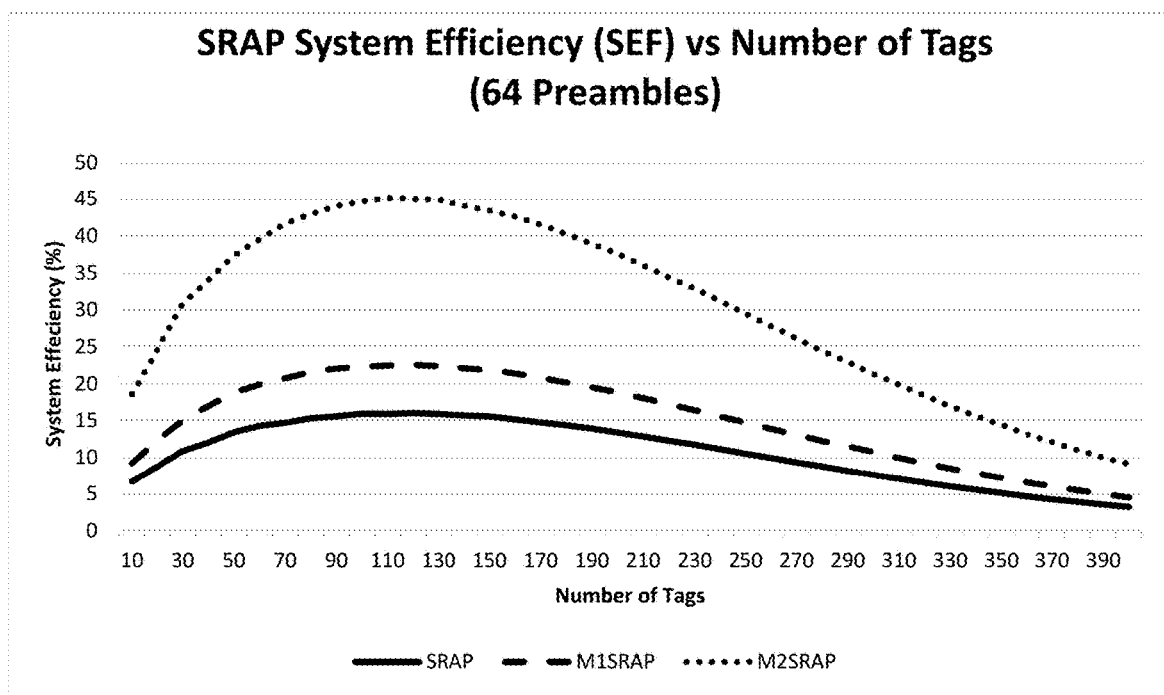
FIG. 9: compares system efficiency based on number of tags for the three disclosed SRAP embodiments using 64 preambles for chip-based tags

The parameter sizes of M2DSRAP are defined as follows:
Preamble Size: p=$2^n$ (64 or 256 bits in simulated embodiments)
Grant-ID size: $\log_2(p)$ bits
Gen-key size: $\log_2(p)$ bits
N: number of available preambles
N0: number of received preambles in phase 2 represented by the number of bits required to represent them [$\log_2(p)$]
N1: user-selected preamble index of size [$\log_2(p)$] bits
N2: number of received (used) preambles in a given frame
N3: number of successfully received (collision-free) preambles in a given frame
Tag-ID size: application specific
Simulation Results and Discussion The graph depicted in FIG. 9 illustrates the simulation results for the three disclosed SRAP embodiments using 64 preambles. The results show the effect of increasing numbers of RFID tags on the System Efficiency (SEF). SEF is defined as the total number of received Tag-ID bits divided by the total number of bits used in all 5 Phases. The simulations found that M2SRAP performed better than the M1SRAP and SRAP embodiments. In addition, M1SRAP performed better than SRAP as expected. This increased SEF is because the tags store information in their memory which decreases the amount of information transferred over the network.

Additionally, as shown in FIG. 9, as the number of tags increase initially, SEF increases until it reaches a peak value (around 120 tags for 64 preambles in the simulation). SEF then decreases because the number of collisions and retransmissions increase due to the diminishing number of available orthogonal preambles, which in turn requires more frames to successfully transmit all tags.

Figure 10:
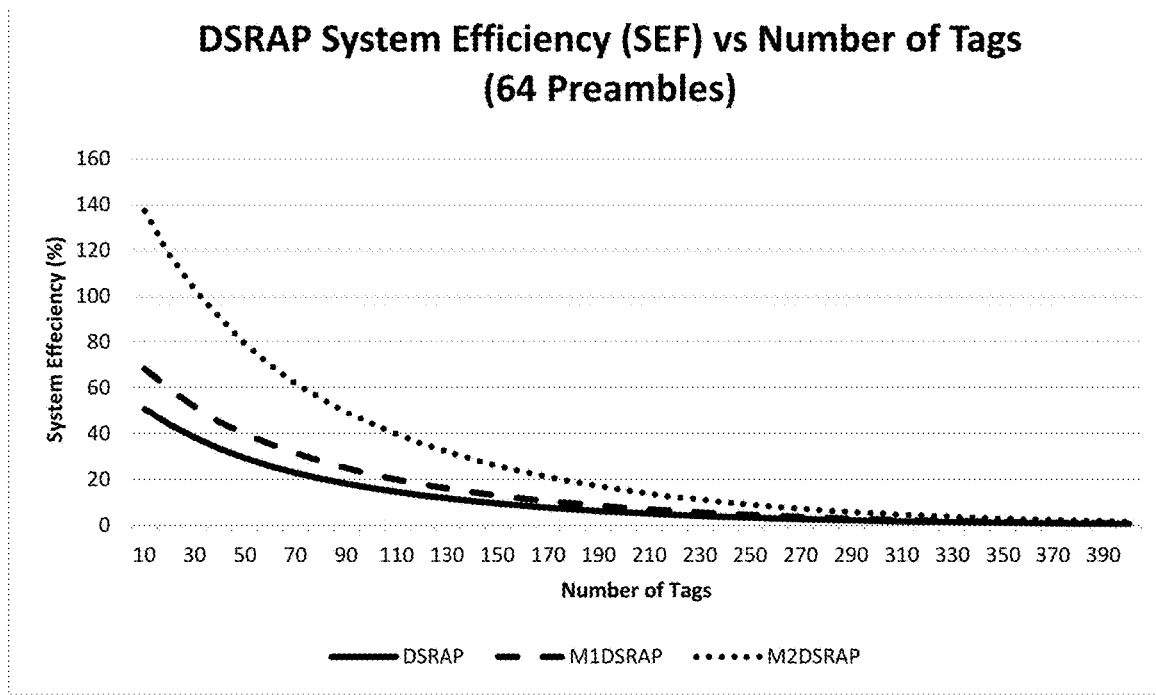
FIG. 10: compares system efficiency based on number of tags for the three disclosed DSRAP embodiments using 64 preambles for chip-based tags

The graph in FIG. 10 depicts SEF as the number of tags increase using 64 preambles and the disclosed DSRAP embodiments. As expected, M2DSRAP and M1DSRAP perform better than DSRAP by saving information in the memory of the tags. As the number of tags increase, SEF decreases until it reaches 0. This is because dynamic frames significantly degrade efficiency when there are more collisions.

Figure 11A:
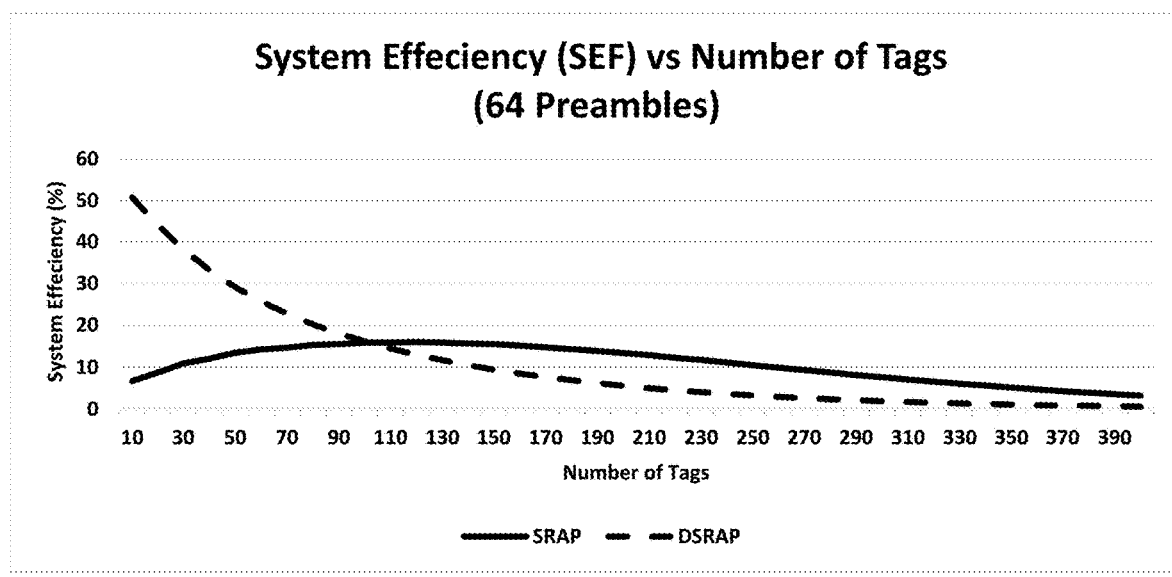
FIG. 11A: compares system efficiency based on number of tags for SRAP and DSRAP embodiments using 64 preambles for chip-based tags
Figure 11B:
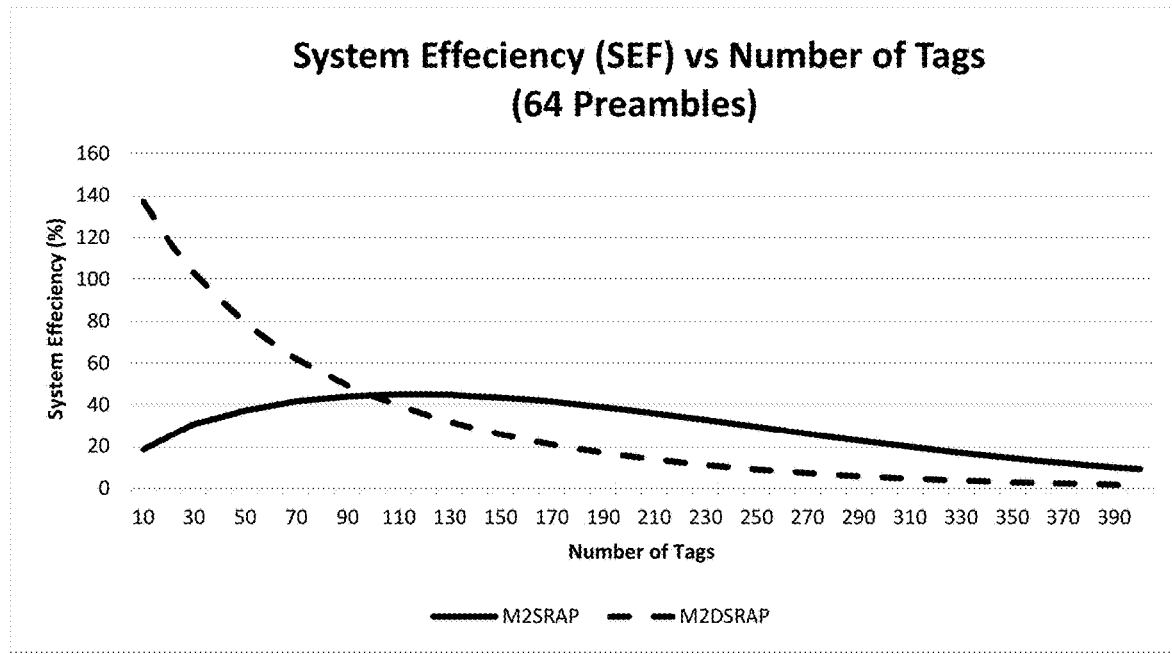
FIG. 11B: compares system efficiency based on number of tags for the second memory-based preamble SRAP and DSRAP embodiments using 64 preambles

FIG. 11A compares the SEF between SRAP and DSRAP for 64 preambles for a maximum of 400 tags. As expected, for low numbers of tags, DSRAP performs better than SRAP because the system reduces the number of transmissions by using dynamic frame size. However, after a threshold (~100 tags), SRAP starts to perform better than DSRAP because SRAP expends fewer resources to successfully transmit all Tag-IDs as the number of collisions increase. Similarly, FIG. 11B shows that M2DSRAP performs better than M2SRAP until the same threshold is reached (~100 tags). After this threshold, M2SRAP performs better.

Figure 12:
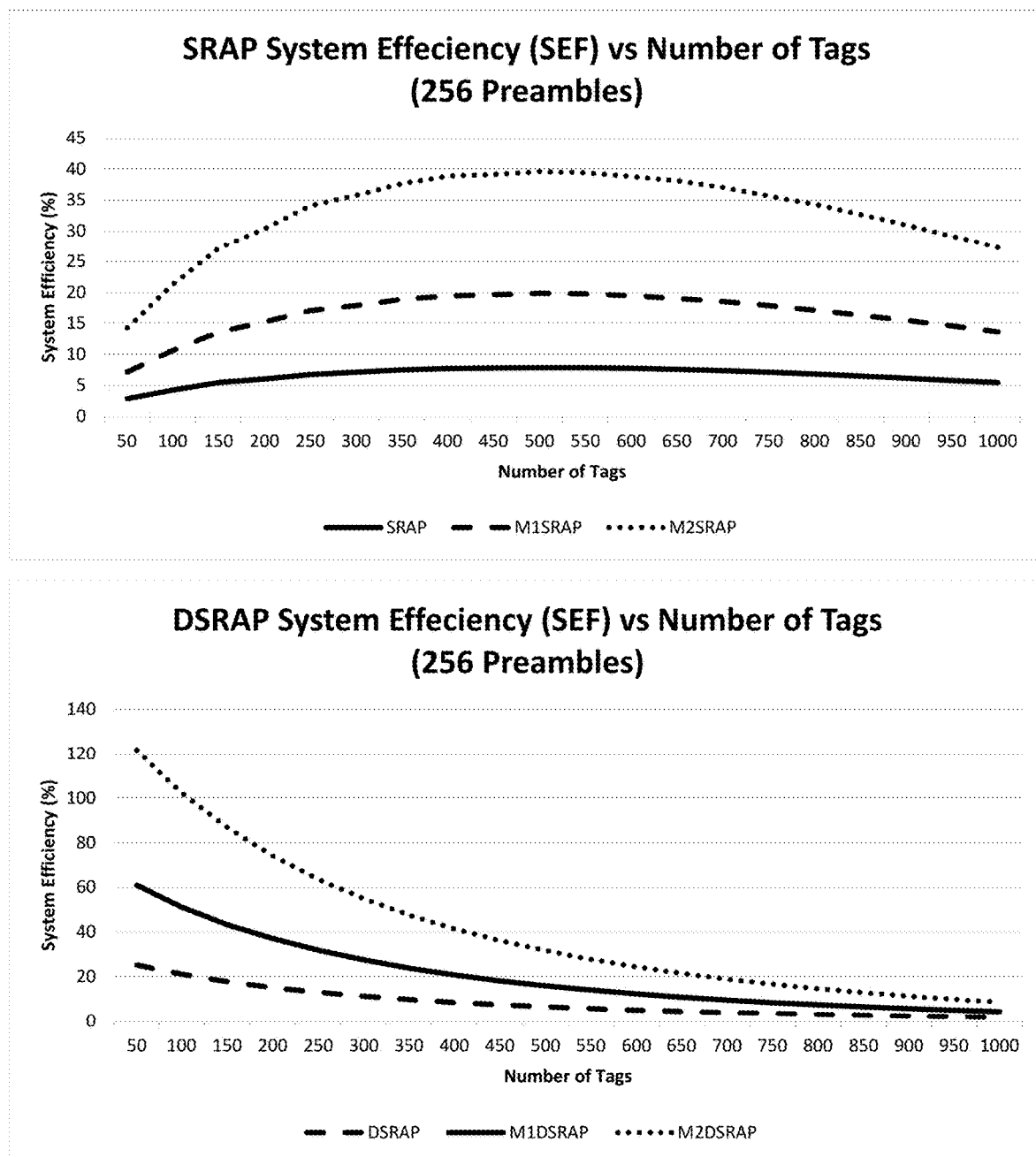
FIG. 12: compares system efficiency based on number of tags for disclosed SRAP embodiments and separately, for disclosed DSRAP embodiments using 256 preambles
Figure 13:
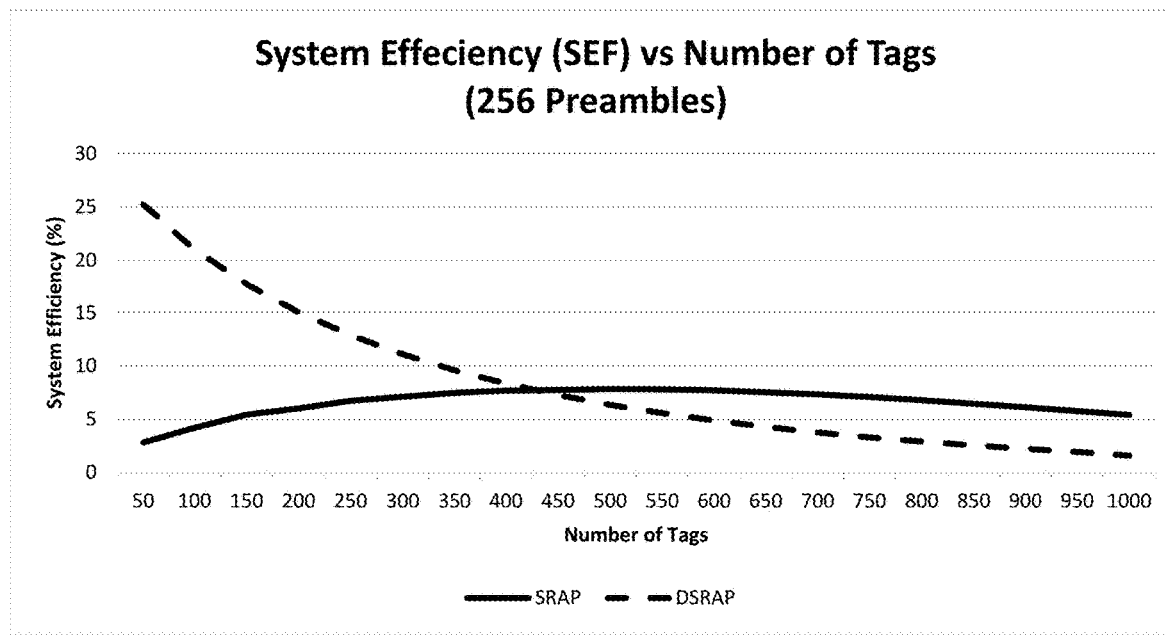
FIG. 13: compares system efficiency based on number of tags between the SRAP and DSRAP embodiments, and the second-memory based SRAP and DSRAP embodiments using 256 preambles
Figure 13:
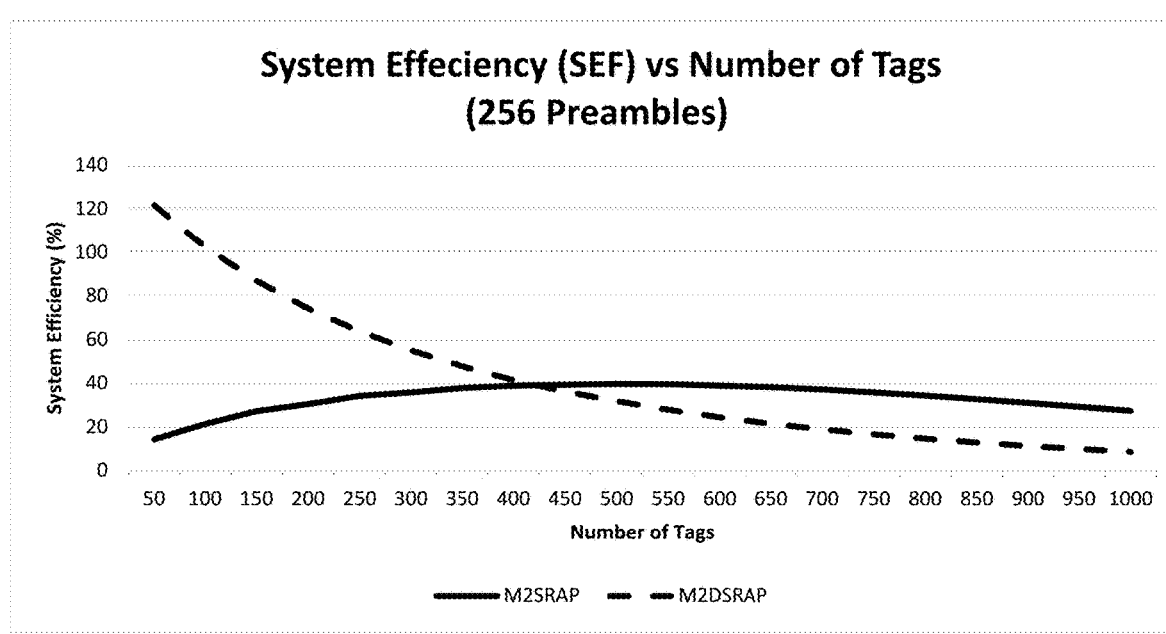

FIGS. 12 and 13 show similar results with embodiments consisting of 256 preambles and up to 1000 tags. Since the number of preambles is higher, the system can handle more tags. In FIG. 12A, the maximum SEF for SRAP, M1SRAP, and M2SRAP is reached at around 500 tags. FIG. 13, shows that our DSRAP embodiments perform better than SRAP until the 450 tag threshold, after which the SRAP embodiments start to perform better.

Figure 14:
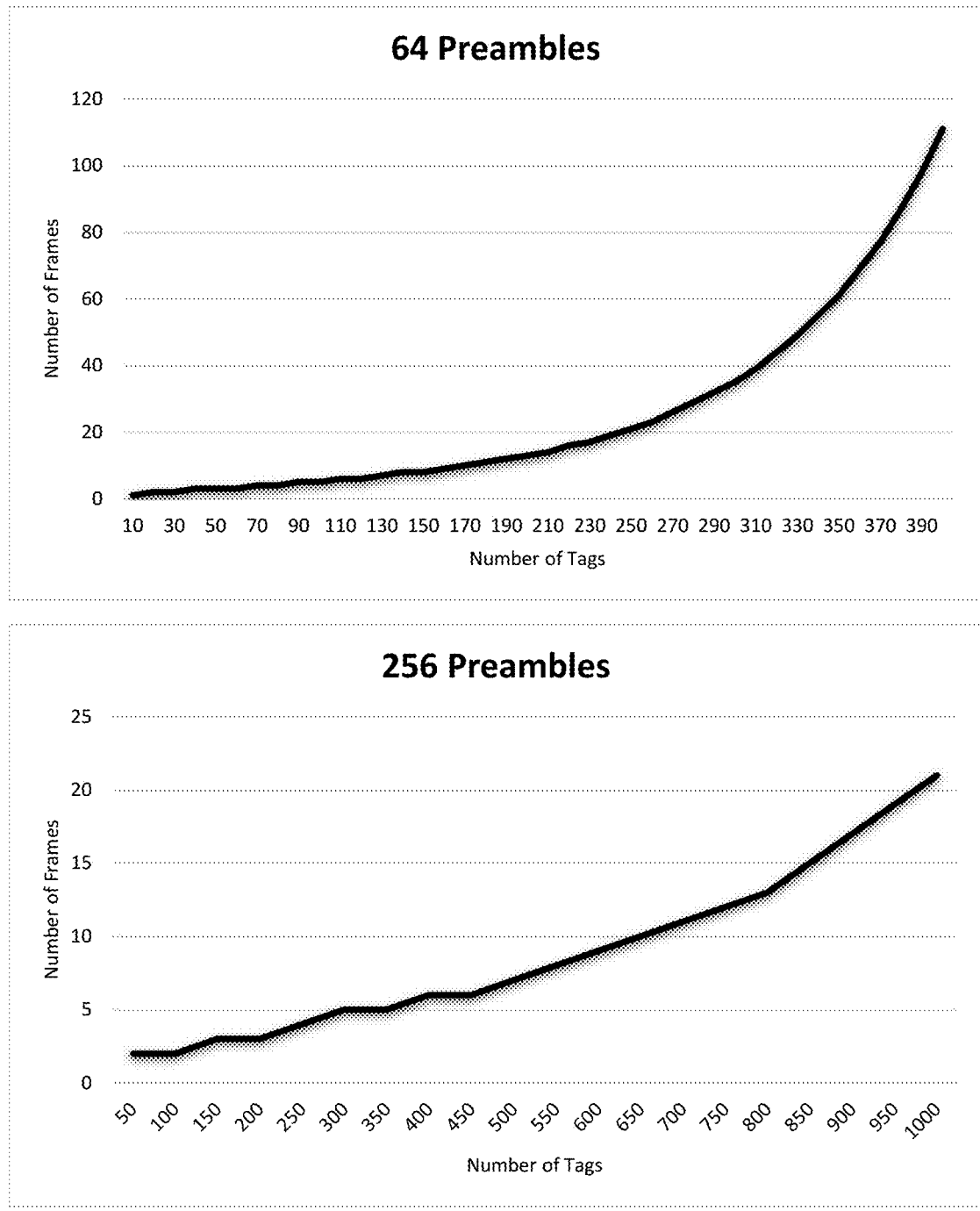
FIG. 14: illustrates the number of frames required for 64 and 256 preambles respectively

FIG. 14 illustrates the number of frames required for 64 and 256 preambles respectively. Note that the average number of frames required for SRAP and DSRAP procedures are the same. The difference, with respect to frames, between SRAP and DSRAP is mainly in the frame size for each of the processes. As the number of tags increase, the frame size increases exponentially which could have a significant impact on SEF in situations involving large numbers of tags.

Recommendations

We recommend a hybrid RFID System with both SRAP and DSRAP processes for optimal performance. FIGS. 9-13 shows that SRAP processes are more efficient than DSRAP processes for higher numbers of tags. By contrast, DSRAP processes are more efficient than SRAP processes with lower numbers of tags. Hence, the disclosed system utilizes both our SRAP and DSRAP embodiments, by setting a "threshold" number of tags in the reader for a given number of preambles. The user would choose which process to use. For example, in a payment station, one might assume that in most cases customers will not exceed 100 products in a given basket or cart, making DSRAP the preferred process. On the other hand, at the exit doors, many customers might leave the store at once, making the SRAP process more appropriate.

Recommendation for IoT Devices

In addition, our novel anti-collision protocol can be integrated into any IoT device or Machine-to-Machine communication system that requires implementation. Currently, most implementations are based on 3GPPP standards which are more complicated, cost more, or require bigger chips than our embodiments. Our anti-collision protocol can be adapted to any Machine-to-Machine communications.

Sample Frame Timing Calculation and Tables

This section shows a frame timing calculation for sample embodiments that use 3GPPP resources for comparison purposes.

Calculations based on 5 MHz Spectrum available.

For 3GPPP/NB-IoT, 5 MHz Occupied Bandwidth is 4.5 MHz. It consists of:

25 Resource Blocks (RBs). A resource block (RB) is the smallest unit of resources that can be allocated to a user. The resource block is 180 kHz wide in frequency and 1 slot long in time. In frequency, resource blocks are (12×15=180) kHz subcarriers Each RB consists of 12 subcarriers, each containing 7 symbols per slot (0.5 ms). Therefore, each RB=12×7× 2=168 Symbols/ms.

Assuming we use similar setup with each symbol is 15 kHz apart and using BPSK (1 bit/symbol):

Each resource=168 bits/ms

In our disclosed SRAP process with 100 tags and 256-bit preambles:

SRAP (per Frame)=8+256+(256+8)*256+(128+8)*256+ (8+8)*256=106760 bits/Frame~600 ms/Frame 2 Frames are required to transmit all 100 Tag-IDs, SRAP (100 tags)~1200 ms=1.2 secs DSRAP process with 100 tags and 256-bit preambles:

DSRAP (per Frame)=8+256+(256+8)*256+ (128+8)*256+(8+8)*256=106760 bits/Frame~600 ms/Frame 2 Frames are required to transmit all 100 Tag-IDs SRAP (100 tags)~1200 ms=1.2 secs Tables 2 and 3 show the total time required to read a specified number of tags. Our disclosed embodiments were able to identify all tags in less than one second, even for large numbers of tags.

TABLE 2

64 Preambles Frame Latency (ms)

| Number of Tags | SRAP | DSRAP | M2SRAP | M2DSRAP |
|---|---|---|---|---|
| 20 | 174.1488 | 34.67857 | 61.7381 | 12.89286 |
| 40 | 253.3333 | 91.4881 | 89.7381 | 33.6369 |
| 60 | 320.3512 | 177.5952 | 115.6726 | 65.2381 |
| 80 | 397.6012 | 300.994 | 141.8452 | 109.6607 |
| 100 | 478.5833 | 471.1786 | 170.6726 | 172.5298 |
| 120 | 570 | 704.9226 | 203.1726 | 257.8333 |
| 140 | 679.8333 | 1013.94 | 241.869 | 370.881 |
| 160 | 803.5893 | 1437.554 | 286.0238 | 521.8512 |

TABLE 3

256 Preambles Frame Latency (ms)

| Number of Tags | SRAP | DSRAP | M2SRAP | M2DSRAP |
|---|---|---|---|---|
| 100 | 18.18388 | 3.628118 | 3.59389 | 0.744629 |
| 200 | 25.35457 | 10.12498 | 5.030735 | 2.058924 |
| 300 | 32.19316 | 20.59202 | 6.393606 | 4.16569 |
| 400 | 39.63094 | 36.54219 | 7.846599 | 7.366737 |
| 500 | 48.59086 | 60.08713 | 9.62244 | 12.03261 |
| 600 | 59.2922 | 93.86917 | 11.79419 | 18.76613 |

Disclosed Chip-Less Collision-Free RFID System

The disclosed chip-less system is a novel embodiment of an ID generation circuit for printable chip-less RFID tags which utilize the intended frequency band to encode bits. The disclosed embodiment is based on a look-up-table scheme which includes a spectrum utilization and capacity enhancement. This is accomplished by storing the tag-ID in a table in the main memory of the reader (look-up-table) or in the middleware database. The unique frequency signature of each tag represents the address of the tag's ID in the database. In addition, a variable delay line will be added to some RFID tags to reuse the same frequency signatures for a given frame. With this combination time-frequency coded chip-less RFID system, millions and billions of products can be uniquely identified within a pre-defined time (~1 sec).

For chip-less RFID systems, our novel embodiment recommends use of high spectrum frequencies such as UWB and/or mmWave. High spectrum frequencies provide more frequencies for RFID systems to use allowing a greater number of unique tags to be processed (as is required for grocery and retail stores).

Frequency Coded Chip-Less RFID System

In the Frequency Coded (FC) chip-less RFID system, the tag reflects the UWB signal sent from the reader transmitter. The ID information of the RF tag depends on the resonance frequencies of the tag. All tags in the Reader interrogation zone will modulate the signal transmitted from the reader by their signature Tag-ID. This signal will then be reflected to the reader. The total received signal is the summation of all backscattered signals from the tags including other noise from the environment. Assume all tags transmit their tag-signatures to the reader at the same time instant. Each tag-signature is represented by a unique frequency. The reader will look for the Tag-ID based on the tag-signature at a database table stored in the memory of the reader or the middleware according to a unique address extracted from the tag's response.

In the preferred embodiment, each tag may consist of either one resonant or two resonant circuits:

Option 1 (One resonator): In this case, the reader will send an interrogation signal (or a pulse) at each tag-signature frequency. The tag will reflect the modulated signal back to the reader using the same tag-signature frequency.

Pros: smaller tag sizes.

Cons: more signals transmitted from the reader.

Option 2 (Two resonator): In this case, the reader will send one interrogation signal (or a pulse) for all tags at a pre-defined frequency. Therefore, the first resonator will be used for the common signature and the second resonator is unique for each tag. Pulse-based signals or notch filters can be used to represent each frequency signature.

Pros:
Simpler Reader design as only one common pulse or notch is used for all tags.
Small size tags compared to multi-resonator based chip-less tags.

Cons: bigger size tags than one resonator option.

The number of tags that a reader can represent at any given time instant is given by the equation:

$$N = \frac{\text{Spectrum } BW}{\text{Pulse} - \text{Notch } BW} - 1$$

Therefore, for narrow Pulse and Notch bandwidths, a reader can represent more tags at a given spectrum bandwidth. Moreover, the number of bits that represents the Tag-ID is not restricted by the physical structure of the tag since they are stored digitally in the database. This is a major advantage over the tags currently used in the market in which each bit is represented by a given frequency pulse. For example, at present, to represent just an 8-bit tag-ID, A chip-less RFID tag would need 8 resonators using the known frequency signature. This is the main factor that currently limits the use of chip-less RFIDs in commercial markets. The disclosed embodiment resolves this issue and can represent a 128-bit Tag-ID with just one or two resonators. This would make chip-less RFID tags applicable to grocery and retail settings, among others.

Frequency Coded Chip-Less RFID System with Time-Delay

Figure 15:
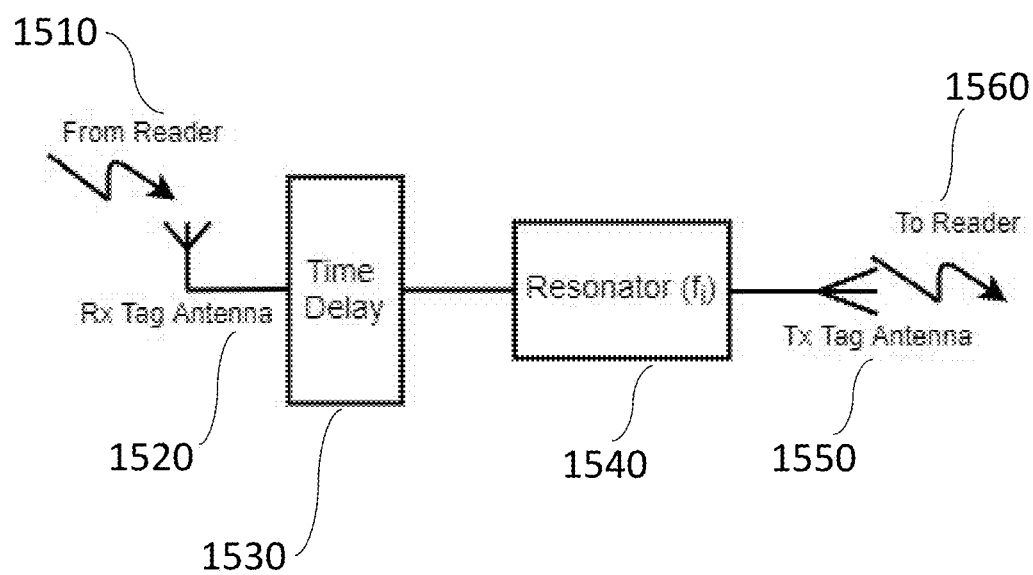
FIG. 15: is an embodiment of a chip-less RFID system consisting of cross-polarized receiving and transmitting tag antennas, a time delay circuit, and one or two resonators

As shown in FIG. 15, an embodiment of the disclosed chip-less frequency-time coded tag consists of cross-polarized receiving 1520 and transmitting 1550 tag antennas, a time delay circuit 1530, and one (Option 1) or two (Option 2) resonators 1540. A short duration pulse 1510 is required to interrogate the tag. A pulse 1510 will be sent via the reader antenna with correct polarization to energize the tag.

When that interrogation signal passes through the time delay and the resonator sections, a read-out signal 1560 containing the tag response is created and will be picked up by the reader's receiving antenna. Here, the read-out signal will consist of one retransmitted pulse 1560 emitted from the transmitting tag antenna 1550. The retransmitted pulse (or notch) will contain the spectral signature generated by the resonator 1540 placed along the corresponding transmission lines. Depending on the tag-ID design, the time delay 1530 will be a multiple of $\Delta t$. For example, if no time delay is required, the tag signal will be automatically retransmitted at time 0. While if one instant time delay is required, the tag signal will be delayed in time by $\Delta t$ and so on. Since each tag contains only one time-frequency combination, the Reader will be able to distinguish the signal of each tag within its interrogation zone.

Figure 16A:
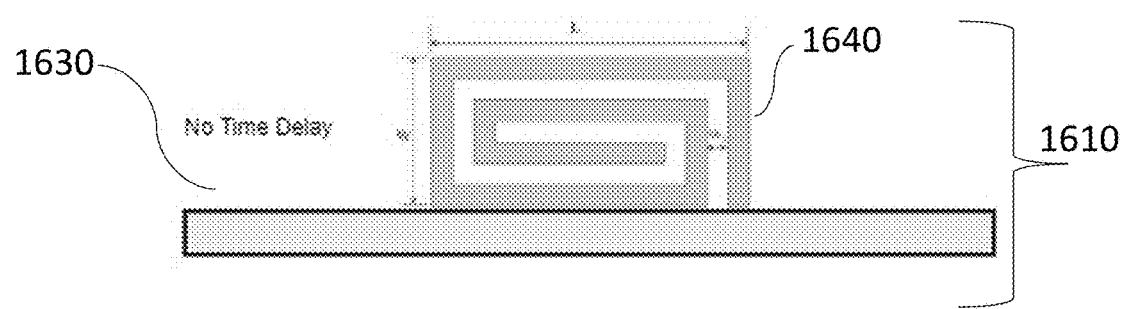
FIG. 16A: is an embodiment of a chip-less tag that does not include a time delay
Figure 16B:
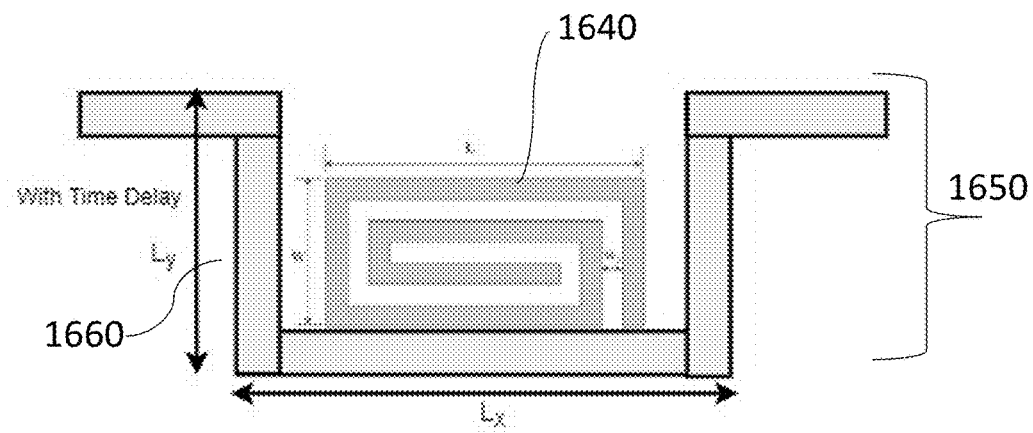
FIG. 16B: is an embodiment of a chip-less tags using time delays and a single resonator
Figure 17A:
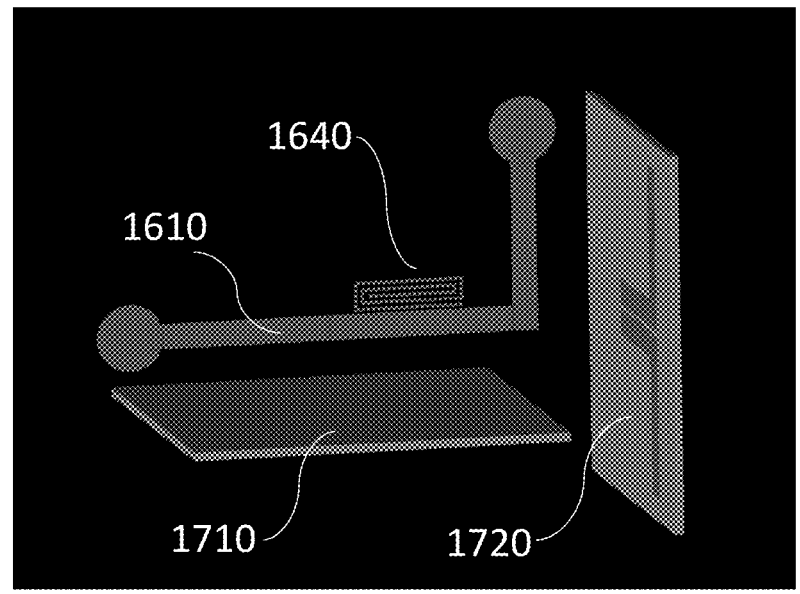
FIG. 17A: is a three-dimensional view of a chip-less tag system without time delays using one resonator
Figure 17B:
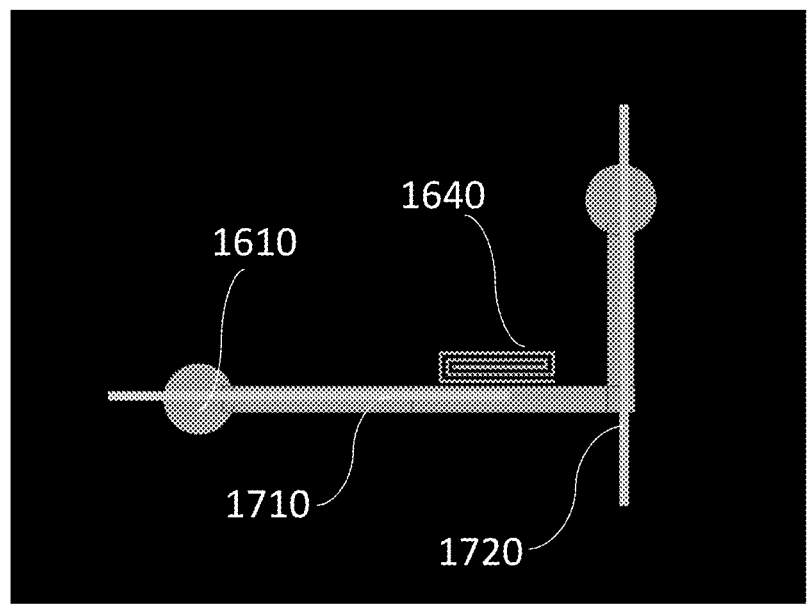
FIG. 17B: is a cross-sectional view of a chip-less tag without time delays using one resonator
Figure 18A:
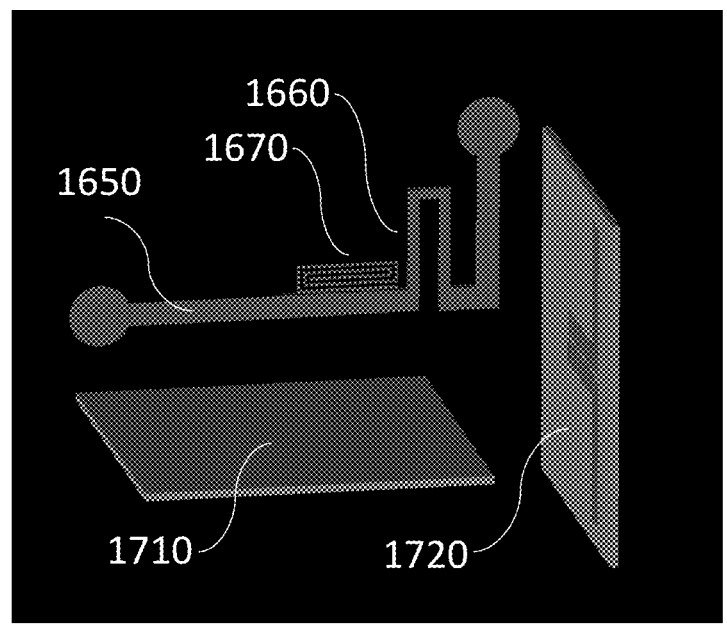
FIG. 18A: is a three-dimensional view of a chip-less tag with time delays using one resonator
Figure 18B:
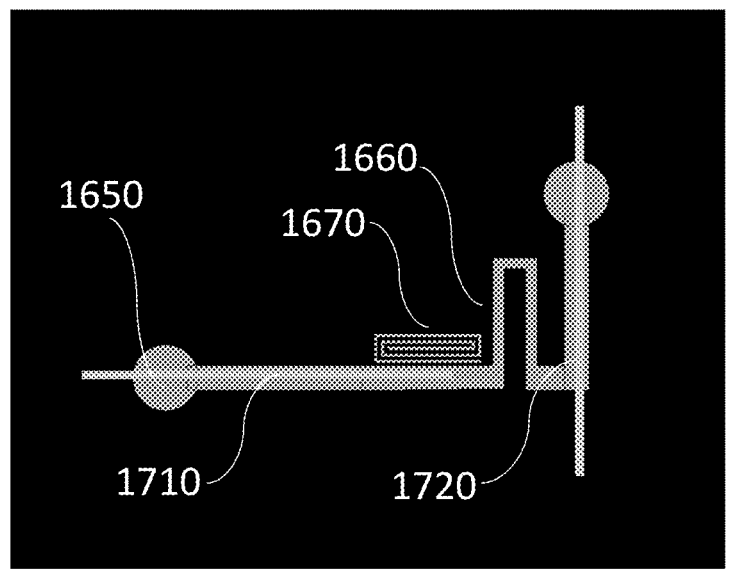
FIG. 18B: is a cross-sectional view of a chip-less tag with time delays using one resonator.

FIG. 16A depicts a chip-less tag embodiment 1610 that does not include a time delay 1630. FIG. 16B is one embodiment of chip-less tags 1650 using time delays and a single resonator. Here, spiral resonators 1640 are considered. However, any type of resonators can be used for our disclosed systems. The time delay 1660 can be changed as required by varying the vertical arm (Ly) length or by introducing more meandered sections in the circuit layout. FIGS. 17A and B show a three-dimensional and cross-section view of the tag 1610 without time delays. FIGS. 18A and B shows a three-dimensional cross-section view of the tag 1650 with time delays.

RFID Reader Time of the Time-Frequency Coded Chip-Less Tags

The database table that contains the Tag-IDs is stored in the memory of either the reader or the middleware. This table will be pre-defined and stored once with all possible chip-less tag-IDs. The addresses in this database table represent the unique frequency and time combination signature of the tag's unique impulse or notch position. The size of the database table is determined by the number of tags that could be identified through the operating frequency as well as the number of time delays added. For example, if we use 3 GHz of operating frequency and every frequency signature impulse or notch requires 3 kHz ($\Delta f$), without considering time delays the size of the table will be (3,000,000/3=1,000,000). This means that according to this embodiment, the RFID system can handle 1 million tags. Every time a time delay (d) is added, another 1 million tags will be added. Therefore, if a large grocery or retail store needs to plan for 1 billion products and every time delay is 1 ms ($\Delta t$), the RFID Reader can scan all frequency-time signatures by:

$$\text{Total Reader Time} = \frac{\text{\# of Tags}}{\frac{\text{Operating Range}}{\Delta f}/\Delta t} = \frac{1 \text{ billion}}{1 \text{ million}/1 \text{ ms}} = 1 sec$$

This time can decrease if shorter time delays are added or more tags are included at a given frequency range. This allows the reader to scan large numbers of chip-less tags in small amounts of time. For example, in a grocery store, the disclosed novel frequency-time coding may allow the reader to scan all chip-less tags in a shopping cart within a fraction of a second.

RFID Reader Implementation

The disclosed embodiment for the chip-less RFID system may require an efficient frequency sweeping methodology to increase the reading distance and frequency operating range. The reader will sweep the overall operating frequency with hopping techniques in order to reduce the overall system latency by minimizing the number of scanned frequencies (the number of hops). In addition, the Reader will scan the same frequency hops at every time delay according to the total number of tags in the system. The frequency step estimation is used for sweeping the overall operating frequency, according to the frequency signature pattern, which is expected to enhance the system latency significantly.

Furthermore, since chip-less Tag-IDs are stored in the database of the main memory at the reader or middleware, the disclosed embodiment obtains the address through the frequency-time shift between the tag's unique signature and the preamble or initial frequency as shown in Table 4. Thus, each tag has a unique address in the memory table.

TABLE 4

Database Table for the Chip-less Tag-IDs

| Frequency-Time Shift (Unique Address Key) | Tag-ID | | |
|---|---|---|---|
| | $b_k$ | ... $b_1$ | $b_0$ |
| $a_0 = f_0 + d_0$ | 0 | 0 | 0 |
| $a_1 = f_0 + (1 \times \Delta f) + d_0$ | 0 | 0 | 1 |
| $a_2 = f_0 + (2 \times \Delta f) + d_0$ | | | |
| ... | | | |
| $a_N = f_0 + (N \times \Delta f) + d_0$ | 1 | 1 | 1 |
| $a_{N+1} = f_0 + (0 \times \Delta f) + d_1$ | 0 | 0 | 0 |
| ... | | | |

A person skilled in the relevant art will recognize that other configurations and arrangements can be used without departing from the spirit and scope of the invention. It will be apparent to a person skilled in the relevant art that this invention can also be employed in a variety of other systems and applications.

What is claimed is:

1. A computer software product that includes a non-transitory storage medium readable by a processor, the non-transitory storage medium having stored thereon a set of instructions for a memoryless chip-based collision-free radio frequency identification (RFID) tag Simple Random-Access Procedure (SRAP), the instructions comprising:

a first phase of instructions which, when loaded into RFID Reader memory following receipt of a returned synchronization signal that includes a transmission of reader identification (Reader-ID) and executed by the processor, causes a plurality of RFID tags within an RFID Reader range to wake up and synchronize by receiving and decoding the synchronization signal and the Reader-ID, wherein the plurality of RFID tags are synchronized to a downlink RFID Reader signal;

a second phase of instructions which, when loaded into RFID Reader memory following the receipt of the synchronization signal and executed by the processor, causes the plurality of RFID tags within the RFID Reader range to randomly select a random preamble sequence from a set of sequences available, wherein the plurality of RFID tags perform the calculation of the preamble sequence internally without having to store any random sequence in memory;

a third phase of instructions which, when loaded into RFID Reader memory following the receipt of the synchronization signal and executed by the processor, causes the RFID Reader to assign resources to the plurality of RFID tags for each preamble received in the second phase of instructions, wherein the RFID Reader transmits a random-access response that carries the received preamble and a random temporary Tag-ID (Grant-ID) and wherein the plurality of RFID tags each store the Grant-ID as a temporary component of the preamble sequence;

a fourth phase of instructions which, when loaded into RFID Reader memory following the receipt of the synchronization signal and executed by the processor, causes the plurality of RFID tags to synchronize in a return direction and transmit the Grant-ID to the RFID Reader through an assigned Grant-ID resource, wherein the plurality of RFID tags create a new random Gen-key ID along with a Tag-ID message and enable the RFID Reader to identify a collision between tags with the same preamble message; and a fifth phase of instructions which, when loaded into RFID Reader memory following the receipt of the synchronization signal and executed by the processor, causes the RFID Reader to accept the transmission from the plurality of RFID tags and acknowledge each successful transmission with an ACK message, wherein the ACK message contains the Grant-ID assigned by the RFID Reader in the third phase of instructions along with the Gen-key ID assigned by the plurality of RFID tags in the fourth phase of instructions, such that the RFID Reader recognizes the plurality of RFID tags as read and makes its Grant-ID available again for a future SRAP with other RFID tags.

2. The computer software product of claim 1, wherein the plurality of RFID tags randomly select the preamble sequence from a set of orthogonal sequences available, wherein the preamble size, "p" is 2n bits, where n is any integer.

3. The computer software product of claim 1, wherein the Grant-ID is an uplink resource allocation for each preamble received by the RFID Reader and, when the third phase of instructions is loaded into RFID Reader memory following receipt of the synchronization signal and executed by the processor, the third phase of instructions causes each of the plurality of RFID tags to map the preamble sent by the RFID Reader and identify which grants are intended for the respective RFID tag.

4. The computer software product of claim 1, wherein the Grant-ID [$\log_2(p)$] represents an index from 0 to [p−1], where p represents both the number of available preambles and the size of the preambles in bits, and the size of the third phase of instructions is [Preamble size (p)+Grant-ID size]× N, where N is the number of available preambles (p).

5. The computer software product of claim 1, wherein the size of the fourth phase of instructions including the random Gen-key ID [$\log_2(p)$] and the Tag-ID message created by the plurality of RFID tags is [Tag-ID size+Grant-ID size+Gen-key ID size]×N, where N is the number of available preambles (p).

6. The computer software product of claim 1, wherein after the plurality of RFID tags receives the ACK and compares the parameters in the fifth phase, the plurality of RFID tags matches both the Grant-ID and Tag-ID to confirm it has been read and goes into sleep mode until prompted to wake up;

wherein the size of the fifth phase is [Grant-ID+Gen-key]×N bits, where N is the number of available preambles (p).

7. The computer software product according to claim 1, further comprising a first memory-based preamble SRAP (M1SRAP), wherein the orthogonal preambles are saved in the memory of the plurality of RFID tags.

8. The computer software product according to claim 7, wherein M1SRAP the preambles are not transmitted with the Grant-IDs during the third phase of the instructions because each slot corresponds to the index of the mapped preamble, thereby reducing the number of transmitted bits and increasing system efficiency.

9. The computer software product according to claim 7, wherein M1SRAP the size of each phase is the same as SRAP except for phase 3;

wherein the size of the third phase of instructions is [Grant-ID size]×N, where N is the number of available preambles (p).

10. The computer software product according to claim 1, further comprising a second memory-based preamble/modulation SRAP (M2SRAP), wherein the orthogonal preambles are saved in the memory of the plurality of RFID tags, wherein the memory of the transmitter of the plurality of RFID tags incorporates a pre-defined memory-based modulation (QAM) signal, wherein a constellation of coding symbols related to the QAM signal can be saved in the memory of the plurality of RFID tags such that whenever a specific symbol is required to be sent, it will be saved in the memory of the plurality of RFID tags.

11. The system according to claim 1, further comprising a parent-tag ID stored in a main memory of the RFID reader or in a middleware database, wherein the parent-tag ID represents a bundle comprising of one or more Tag-ID's.

12. A computer software product that includes a non-transitory storage medium readable by a processor, the non-transitory storage medium having stored thereon a set of instructions for performing a memoryless chip-based collision-free radio frequency identification (RFID) tag Dynamic Simple Random-Access Procedure (DSRAP), the instructions comprising:
  a first phase of instructions which, when loaded into RFID Reader memory following receipt of a synchronization signal that includes a transmission of reader identification (Reader-ID) and executed by the processor, causes a plurality of RFID tags within an RFID Reader range to wake up and synchronize by receiving and decoding the synchronization signal and the Reader-ID, wherein the plurality of RFID tags are synchronized to a downlink RFID Reader signal;
  a second phase of instructions which, when loaded into RFID Reader memory following the receipt of the synchronization signal and executed by the processor, causes the plurality of RFID tags within the RFID Reader range to randomly select a random preamble sequence from a set of sequences available, wherein the plurality of RFID tags perform the calculation of the preamble sequence internally without having to store any random sequence in memory;
  a third phase of instructions which, when loaded into RFID Reader memory following the receipt of the synchronization signal and executed by the processor, causes the RFID Reader to assign resources to the plurality of RFID tags for only the preambles received in the second phase of instructions, wherein the RFID Reader transmits a Random-Access Response that carries the received preamble and a random temporary Tag-ID (Grant-ID) and wherein the plurality of RFID tags each store the Grant-ID as a temporary component of the preamble sequence;
  a fourth phase of instructions which, when loaded into RFID Reader memory following the receipt of the synchronization signal and executed by the processor, causes the plurality of RFID tags to synchronize in a return direction and transmit the Grant-ID to the RFID Reader through an assigned Grant-ID resource, wherein the plurality of RFID tags create a new random Gen-key ID along with a Tag-ID message and enable the RFID Reader to identify a collision between tags with the same preamble message; and
  a fifth phase of instructions which, when loaded into RFID Reader memory following the receipt of the synchronization signal and executed by the processor, causes the RFID Reader to accept the transmission from the plurality of RFID tags and acknowledge each successful transmission with an ACK message, wherein the ACK message contains the Grant-ID assigned by the RFID Reader in the third phase of instructions along with the Gen-key ID assigned by the plurality of RFID tags in the fourth phase of instructions, such that the RFID Reader recognizes the plurality of RFID tags as read and makes its Grant-ID available again for a future DSRAP with other RFID tags.

13. The computer software product of claim 12, wherein the plurality of RFID tags randomly select the preamble sequence from a set of orthogonal sequences available, wherein the preamble size, "p" is $2^n$ bits, where n is an integer.

14. The computer software product of claim 12, wherein the Grant-ID is an uplink resource allocation for only the preambles received by the RFID Reader in the second phase of instructions and, when the third phase of instructions is loaded into RFID Reader memory following receipt of the synchronization signal and executed by the processor, the third phase of instructions causes each of the plurality of RFID tags to map the preamble sent by the RFID Reader and identify which grants are intended for the respective RFID tag.

15. The computer software product of claim 12, wherein the size of the first two phases are the same as SRAP and;
  wherein the Grant-ID represents an index from 0 to [p−1], where p represents both the number of available preambles and the size of the preambles in bits, the size of the third phase of instructions is N0+[Preamble size (p)+Grant-ID size]×N2, where N0 is the number of received preambles in phase 2 represented by the number of bits required to represent them [$\log_2(p)$] bits, and N2 is the number of received (used) preambles in a given frame, enabling the plurality of RFID tags to recognize which preambles have been received in the second phase of instructions.

16. The computer software product of claim 12, wherein the size of the fourth phase of instructions is [Tag-ID size+Grant-ID size+Gen-key ID size]×N2, where the Tag-ID, the Grant-ID, and the Gen-key ID are only reserved for the number of preambles received in the second phase of instructions (N2).

17. The computer software product of claim 12, wherein the size of the fifth phase is $N_{ACK}$+[Grant-ID size+Gen-key ID size]×N3, where $N_{ACK}$ is the number of tags with ACK messages in Phase 5 represented by the number of bits required to represent them [$\log_2(p)$] bits, and N3 is the number of successfully received (collision-free) preambles in a given frame.

18. The computer software product of claim 12, wherein after the plurality of RFID tags receives the ACK and compares the parameters in the fifth phase, the plurality of RFID tags matches both the Grant-ID and Tag-ID to confirm it has been read and goes into sleep mode until prompted to wake up.

19. The computer software product according to claim 12, further comprising a first memory-based preamble DSRAP (M1DSRAP), wherein the orthogonal preambles are saved in the memory of the plurality of RFID tags.

20. The M1DSRAP according to claim 19, wherein in the M1DSRAP the preambles are not transmitted with the Grant-IDs during the third phase of the instructions because each slot corresponds to the index of the mapped preamble, thereby reducing the number of transmitted bits and increasing system efficiency.

21. The M1DSRAP according to claim 19, wherein the size of each phase is the same as DSRAP except in the third phase;
  wherein the size of the third phase of instructions is N0+[N1+Grant-ID size]×N2, where N0 is the number of bits required to represent the number of received preambles in phase 2 [$\log_2(p)$] bits, N1 is the user-selected preamble index of size [$\log_2(p)$] bits, and N2 is the number of received (used) preambles in a given frame.

22. The software product according to claim 12, further comprising a second memory-based preamble/modulation DSRAP (M2DSRAP), wherein the orthogonal preambles are saved in the memory of the plurality of RFID tags, wherein the memory of the transmitter of the plurality of RFID tags incorporates a pre-defined memory-based modulation (QAM) signal, wherein a constellation of coding symbols related to the QAM signal can be saved in the memory of the plurality of RFID tags such that whenever a specific symbol is required to be sent, it will be saved in the memory of the plurality of RFID tags.

23. The system according to claim 12, further comprising a parent-tag ID stored in a main memory of the RFID reader or in a middleware database, wherein the parent-tag ID represents a bundle comprising of one or more Tag-ID's.

24. A Frequency Coded (FC) chip-less RFID system, comprising:
    a plurality of printed chip-less RFID tags, comprising:
        a cross-polarized receiving tag antenna;
        a cross-polarized transmitting tag antenna;
        a time delay circuit;
        a combination of two resonators, wherein the resonators represent a tag-ID; and
        a short duration pulse from an RFID Reader to interrogate the plurality of printed chip-less RFID tags, wherein correct polarization energizes at least one of the tags;
    wherein when an interrogation signal is passed through the time delay circuit and the resonators, the interrogation signal causes generation of a read-out signal containing a tag response, wherein the read-out signal consists of one retransmitted pulse emitted from the transmitting tag antenna, where the retransmitted pulse will contain a spectral signature generated by the resonators placed along corresponding transmission lines, from which the reader will pick up a tag response.

25. The system according to claim 24, further comprising a plurality of tag-IDs stored in a table in a main memory of the RFID Reader in a look-up-table or in a middleware database, wherein a unique frequency signature of each printed chip-less RFID tag represents an address of the tag's ID in the middleware database.

26. The system according to claim 24, wherein the time delay circuit is configured to create a time delay having a length equal to a multiple of $\Delta t$, where $\Delta t$ is greater than or equal to the time from the generation of a read-out signal containing a tag response and retransmission to a reader.

27. The system according to claim 24, further comprising a parent-tag ID stored in a main memory of the RFID reader or in a middleware database, wherein the parent-tag ID represents a bundle comprising of one or more tag-ID's.

* * * * *